(12) United States Patent
Hayes

(10) Patent No.: US 6,212,239 B1
(45) Date of Patent: Apr. 3, 2001

(54) CHAOTIC DYNAMICS BASED APPARATUS AND METHOD FOR TRACKING THROUGH DROPOUTS IN SYMBOLIC DYNAMICS DIGITAL COMMUNICATION SIGNALS

(76) Inventor: Scott T. Hayes, 1000 Dennis Ave., Silver Spring, MD (US) 20901

( * ) Notice: Subject to any disclaimer, the term of this patent is extended or adjusted under 35 U.S.C. 154(b) by 0 days.

(21) Appl. No.: 09/005,162

(22) Filed: Jan. 9, 1998

(51) Int. Cl.$^7$ ........................................................ H04L 1/00
(52) U.S. Cl. ........................... 375/259; 375/227; 375/377
(58) Field of Search ...................................... 375/227, 259

(56) References Cited

U.S. PATENT DOCUMENTS

| | | | | |
|---|---|---|---|---|
| 5,291,555 | * | 3/1994 | Cuomo et al. | 380/263 |
| 5,748,851 | * | 5/1998 | Iokibe et al. | 706/58 |
| 5,890,142 | * | 3/1999 | Tanimura et al. | 706/12 |

OTHER PUBLICATIONS

"The Role of Synchronization in Digital Communications Using Chaos–Part I: Fundamentals of Digital Communications", Géza K Kolumbán, Micheel Peter Kennedy and Leon O. Chua, IEEE Trans. on Circuits and Systems–I., vol. 44, No. 10, pp. 927–936, Oct. 1997.*

"The Role of Synchronization in Digital Communications Using Chaos–Part II: Chaotic Modulation and Chaotic Synchronization", Géza Kolumbán, Micheal Peter Kennedy and Leon O. Chuan, IEEE Trans on Circuits and Systems–I, vol. 45, No. 11, pp. 1129–1140, Nov. 1998.*

* cited by examiner

Primary Examiner—Stephen Chin
Assistant Examiner—Paul N Rupert
(74) Attorney, Agent, or Firm—Laurence E. Stein, Esq.

(57) ABSTRACT

A communication system having a transmitter chaotic signal generator and a receiver chaotic signal generator which when uncoupled generate state signals along substantially identical chaotic attractor trajectories in an out of phase relation. A controller controls the transmitter chaotic signal generator to transmit a state signal having segments of the deterministic state trajectory which identify a subsequent length of the deterministic state trajectory matching an input N-bit sequence. A receiver coupler receives the transmitted state signal and, if the signal is above a threshold for a duration of approximately two bit periods, synchronizes the receiver chaotic signal generator to the segment of its deterministic state trajectory indicated by the state signal to generate, with or without coupling, the subsequent length of that state trajectory matching the input N-bit sequence. A receiver symbol detector reconstructs the N-bit sequence based on the receiver chaotic oscillator state signal.

10 Claims, 19 Drawing Sheets

CHAOTIC DYNAMICS BASED APPARATUS AND METHOD FOR TRACKING THROUGH DROPOUTS IN SYMBOLIC DYNAMICS DIGITAL COMMUNICATION SIGNALS

DESCRIPTION

1. Field of the Invention

This invention generally relates to the field of symbol communication and, more particularly, to the field of symbol communication with an encoding scheme for a receiver to reconstruct symbols occurring during periods in which the received signal is too weak or corrupted by noise to be accurately detected.

2. Description of the Related Art

The ideal case in any communication system is for the receiver to detect and identify, with perfect and uninterrupted accuracy, the sequence of symbols sent out by the transmitter. However, as is well known in the prior art, this level of detection is not generally possible in an actual communication system due to, for example, channel fading and in-band noise. Conventional communication systems are therefore designed to only attain a selected performance level in terms of bit error rate. The available system architectures, design methodologies, and hardware selection criteria used by designers to achieve a workable communication system meeting a given bit error rate are well known and are thoroughly described in various treatises.

There are certain issues, though, which generally govern the design and performance of prior art communication systems. More particularly, the parameters that determine the bit error rate include the transmitter power, the channel bandwidth, the symbol or bit rate, the channel physical length, the channel quality, and the in-band noise power. The term "bit error rate", as used above, means the error rate by the receiver on a bit-by-bit basis. As is well known in the art, transmitter power and channel bandwidth are generally fixed. Therefore, to attain a desired bit error rate at the required bit rate, the transmitted bit or symbol sequence is frequently encoded by any of the various well-known redundancy codes prior to transmission. This allows error detection and correction by the receiver.

However, these codes have known drawbacks. One of the drawbacks is that extra bits or symbols must be added to convey the redundancy information, and the extra bits use valuable channel capacity. Another drawback is that the encoding and decoding schemes are generally computationally intensive. Still another, particularly serious drawback is that channel fading, or path loss, often results in the loss of several bits in sequence. These are generally termed "block drop outs" and, as is known in the art, the number of bits in the lost block frequently exceeds the maximum number that the redundancy code can correct, or even detect. The prior art therefore generally employs interleaved coding schemes, in addition to the redundancy coding schemes. These methods, however, generally fail to provide complete immunity to the block drop outs and, in addition, further increase the computation and related hardware burden.

A previous patent disclosure by the present inventor proposes the use of a dynamically generated chaos signal for information transmission. As described therein, a dynamically generated signal is analog in nature but has a state progression which carries digital information. However, that previous disclosure does not provide a means or method for a receiver to correct or recover the transmitted signal during dropouts nor does it preview this idea.

SUMMARY OF THE INVENTION

The present invention is directed to solving the above-identified problems, and to providing further substantial advantages over the prior art methods and apparatus of signal dropout correction. A general embodiment of the invention comprises an apparatus and method for controlling chaotic oscillations of a transmitter-based physical oscillator in such a way that the resulting oscillator signal has a trajectory which carries a desired symbolic (digital) information, and for transmitting the oscillator signal, and for coupling a received version of the transmitter signal to a receiver-based chaotic oscillator which is substantially identical in its dynamical motion to the transmitter oscillator. If the received signal has, for even a very short time period, a signal-to-noise ratio greater than a certain threshold the receiver-based chaotic oscillator automatically and quickly synchronizes with the transmitter-based oscillator due to the coupling effect of the received signal. This allows the receiver described herein to continue generating the signal through dropouts even when the incoming signal may be completely absent.

According to known chaos theory the state trajectory of a chaotic oscillator is deterministic over infinite time. The method and apparatus of the present invention exploit this theory to transmit and recover symbol information by a fundamentally new approach. A basis of the invention is that if a signal is transmitted carrying information defining the state vector of a first chaotic oscillator with infinite precision, and sent through a noiseless channel, then a receiver having a-priori knowledge of, or a means to duplicate, the first chaotic oscillator's trajectory can predict the signal for all future time based only an instantaneous sample of the received signal. Further, if a first and a second region of a state space defining the first oscillator's trajectory are assigned respective first and second symbol values, then the receiver having the a-prior knowledge can predict the symbol sequence it will receive for infinite time given only one instantaneous point of the transmitted state signal with infinite precision.

In the practical world, though, the state information of the chaotic oscillator cannot be measured with infinite precision. Instead, the oscillator state, or point on its motion trajectory, can be determined only to the accuracy limit of the physical measuring unit, i.e., voltmeter or current meter, that is used. Therefore, an estimate or predictor of a first oscillator's future motion based on a duplicate or model of that oscillator, with the duplicate using an initial state equal to the (inaccurately) measured starting point at t=0, will start with an initial error and the error will progressively increase over time with respect to the first oscillator. However, the estimated future motion of the first oscillator based on the model or duplicate will be accurate within a known maximum error for a finite duration of time, with that duration being a function of the accuracy that the oscillator state information can be measured.

The present invention achieves this predictive receiver function with a receiver oscillator or model oscillator which when coupled with a signal from the transmitter representing the transmitter's state, for a duration sufficient to synchronize with that transmitter oscillator, will lock to and will remain synchronized with it for a determinable length of time, even after the transmitter signal is lost. The lock will be to a precision substantially matching the accuracy by which received transmitter signal represents the transmitter oscillator state. That accuracy depends on the particular hardware in the transmitter that detects its oscillator state, and on the integrity of the transmitter signal when received at the receiver oscillator. As will be understood from the detailed description below, the length of time that the receiver oscillator will remain synchronized to the transmitter oscillator depends on the accuracy of the lock at the time the transmitter signal is lost. The invention thereby uses the receiver oscillator as a predictor of the transmitter signal, for at least that determinable length of time.

Accordingly, the present invention is a fundamentally new method and apparatus for recovering an uninterrupted symbol stream at a receiver, notwithstanding limited periods in which the received signal is either too weak or corrupted for conventional carrier demodulation, or during periods in which the transmitter or the channel, or both, are temporarily shut off. This invention achieves these and other objectives without conventional error correction bits, and without the related mathematical operations generally required for the prior art encoding and decoding of bit information into and from high-redundancy error-tolerant codes.

An example of the first embodiment comprises, in it general form, a transmitter and a receiver, each having a respective chaotic oscillator device. The chaotic oscillator devices in the transmitter and receiver have respective structures such that each exhibits substantially the same free-running dynamical behavior.

The example embodiments are described in terms of oscillators having Lorenz type chaotic behavior, meaning that the trajectory of the oscillator's state vector follows a Lorenz attractor. The definition of a Lorenz attractor is well known to those skilled in the relevant arts. However, this is not a limit on the implementation, as the present system could employ oscillators having other types of chaotic behavior. A complete mathematical description of a Lorenz attractor is not necessary for an understanding of this invention and, therefore, such description is limited here to what is necessary for understanding the structure and operation of this invention. The reader can refer to R. Tokunaga et al., Lorenz Attractor From an Electrical Circuit With Uncoupled Continuous Piecewise Linear Resistor, Intl. Journal of Circuit Theory and Applications, vol. 17, 71–85 (1989), for a more thorough academic discussion on Lorenz attractors.

Further, it will be understood for this description that various structures and devices currently used in communication circuits can be readily connected to exhibit a desired Lorenz behavior, and the specific structure is a design choice selectable from an extremely large range of devices. Examples include transistors, photo-electric devices, and piezo-electric devices.

The transmitter and receiver oscillators of the first example embodiment each include a power supply, a conventional semiconductor transistor, a plurality of resistors, and a plurality of passive reactive elements.

The physical state of each of the Lorenz oscillators is defined by a state space, the basis vectors of the state space being, for example, voltages across or currents through respective circuit elements.

The Lorenz attractor used for this description has two foci in the state space. Accordingly, the transmit and receiver oscillators each have a state vector orbit which wraps around one of the two foci for a random number of cycles, and then transitions over to and orbits around the other focus for a number of cycles. The trajectory of the oscillator's state vector never passes through the exact same point more than once, and there is no periodicity to the number of cycles the vector orbits around a focus before transitioning to the other focus. Therefore, if one of focus is labeled a "0" and the other focus is labeled a "1", the sequence of "1"s and "0"s representing which focus the vector orbits during its trajectory appears, by classical linear analysis, to be random.

However, since the trajectory is in fact deterministic, if the state vector of the oscillator is forced, or "nudged", to a specific point on the trajectory then the progression of the state vector will pick up again from that new point and continue along that deterministic trajectory. The present invention uses this nudging to encode information at the transmitter.

More specifically, the state space of both the transmit and receive oscillator is separated into a first and second region, with one of the Lorenz attractor foci being in the first region and the other focus in the second region. The first focus region represents a first symbol value and the second region represents a second symbol value. Accordingly, the oscillators' vector motion about the respective attractor loci represents as a sequence of these first and second symbol values.

The transmitter of the first embodiment has an N-symbol block sliding block encoder which arranges an input data or bit stream into N-bit blocks, in an N-bit sliding window manner, and has an oscillator control means which forces the transmitter oscillator state point position to a point P within an Xsource(N) interval on the oscillator's Lorenz attractor from which the next N orbits correspond to the bit sequence within that N-bit block. As will be understood by one of ordinary skill in the art, the point P could be a quantized stored target point or could be any arbitrary point, so long as P is inside the Xsource(N) interval. This Xsource(N) interval is termed as the interval which "sources" the desired N-bit symbol stream. The term "interval" or "band" is used for this description, instead of "point" due to the finite bit resolution of the Xsource(N) data.

For the first embodiment, Xsource(N) is a single vector quantity representing one basis vector component, termed Xdetc(t), of the oscillator vector at the interval it pierces the Poincare surface in its state space. According to chaos theory, one basis vector component of the state vector, where it pierces the Poincare surface, is sufficient to uniquely define the interval or band of the Lorenz attractor that the vector is on and, hence, to define the interval sourcing a specific N-bit orbit sequence.

The oscillator control means of the first embodiment comprises a state detecting means for detecting one or more components of the oscillator's state vector and outputting a quantized L-bit Xdetect(nT) in response, a storage means for storing $2^N$ Xsource(N) values, and means for generating a control pulse based on the Xdetect(nT) and the Xsource(N) value and for transmitting the control pulse to an elements of the transmitter chaotic oscillator to force it to the desired source state.

For this example, the detection means has a sample timing generation circuit which generates a Ytrigger signal, having a period of T, based on a voltage or current though components of the oscillator which corresponds to the Poincare surface of the oscillator's Lorenz attractor.

For the first example embodiment, the symbol or bit values of "1" and "0" are mapped to the first and second locus of the Lorenz attractor, respectively. Accordingly, if N is set equal to four, the transmitter encodes an example N-bit block of "0101" by forcing its oscillator to a trajectory interval from which the next four orbits will be once around the first locus, followed by once around the second, then first and then second.

The transmitter has a signal transmitter means which detects an X(t) signal representing the transmitter oscillator state and converts it into an Xtrans(t) signal for transmission. For the first embodiment Xtrans(t) is an amplified form of the continuous time signal from which Xdetect(nT) is sampled. Xtrans(t) for the first example embodiment is generated and output as a baseband electrical signal.

A communication channel connects the transmitter to the receiver. The communication channel, for the first example embodiment, is an electrical wire between the transmitter and receiver. The signal entering the electrical wire is Xtrans(t)signal and the signal exiting the wire at the receiver end is Xrec(t) signal, where Xrec(t) represents Xtrans(t) after being attenuated by the wire and corrupted by channel noise.

The receiver of this embodiment includes a means for receiving the Xrec(t) signal, a chaotic receiver oscillator having a substantially identical Lorenz trajectory as the transmitter oscillator, and means for synchronizing the receiver oscillator to the received Xrec(t) signal. The means for synchronizing comprises, for this example embodiment, a means for coupling the received Xrec(T) signal to one or more circuit components of the receiver oscillator. This coupling novelly exploits the principle that two oscillators which are structurally similar but not coupled will oscillate along identical trajectories, but in an out of synch fashion, but one will quickly lock up to the other when it is coupled by a medium. Thus, for this embodiment, the receiver oscillator will quickly lock up to the transmitter oscillator upon receiving Xrec(t), with the accuracy of the lock being related to the accuracy available from the finitely quantized X(nT) with the added noise within Xrec(T). Therefore, after Xrec(t) is lost, the receiver oscillator, which is structured to oscillate on a Lorenz attractor substantially identical to that of the transmitter oscillator, will continue on the same trajectory as the transmitter oscillator, within a given error for a duration of time equal to at least N orbits. The receiver further includes means for detecting the receiver oscillator state, and means for generating a recovered bit sequence representing the orbit history of the receiver oscillator. For this embodiment the means for generating a recovered bit sequence generates bits according to a threshold or polarity of the signal output from the means for detecting the receiver oscillator state. That threshold or polarity indicates which of the two foci of the Lorenz attractor that the receiver oscillator is on, similar to the symbol mapping scheme described above for the transmitter.

Therefore, as will be readily understood, when the transmitter oscillator is controlled or nudged to a trajectory interval sourcing a specific N-bit orbit sequence, and the receiver oscillator receives just enough of the transmitted signal to lock to the sourcing trajectory, the receiver oscillator will then orbit according to the same N-bit symbol sequence. The receiver apparatus will detect and generate a bit sequence representing that oscillator orbit and, accordingly, will generate the same N-bit symbol sequence that was encoded by the transmitter. Further, as identified by the present inventor, when the received signal integrity is high the time required for the receiver oscillator to lock up to the transmitter oscillator can be very short relative to the symbol rate. Therefore, even if Xrec(t) is totally lost after that short lock up time (which is much less than one bit interval), the receiver will generate the N-bit symbol sequence.

One embodiment of the invention has an apparatus for coupling the received signal Xrec(t) to the receiver oscillator through a binary switch, controlled by a signal magnitude detector for detecting the presence and absence of Xrec(t). Accordingly, when Xrec(t) is present the receiver oscillator is coupled so as to lock up to the transmitter oscillator. When Xrec(t) is absent the receiver oscillator is disengaged and free runs from the pre-loss trajectory point.

Another embodiment comprises a continuously variable coupling means for varying the degree coupling between Xrec(t) and the receiver oscillator depending on that estimated integrity.

Based on either of these embodiments, if Xrec(t) has, for example, high integrity for approximately one bit interval every N intervals, the variable coupling will lock the receiver oscillator to Xrec(t) during that period, which will set up the oscillator's state motion up for the next N orbits in accordance with the N-bit sequence that follows the lock period. If Xrec(t) is subsequently lost the coupling means disengages the receiver oscillator to free run from its lock-up point, and thereby generate the N-bit sequence that follows.

If the signal integrity estimating means, e.g., magnitude detector, estimates a high integrity Xrec(t) at any time to prior to N symbol periods the variable coupling means re-engages coupling of Xrec(t) to the receiver oscillator, and the oscillator will relock. The recovered bit stream RecBit (nT) is thereby output in an uninterrupted manner even though Xrec(t) was of high integrity for only one bit out of N.

Another embodiment of the invention is a modification of either of the first or second embodiments, and further comprises means for encoding an information by a run-length constrained code, and inputting that code to the N-bit symbol encoder for encoding and transmission as the oscillator state based signal Xtrans(t).

A further embodiment of the present invention comprises a receiver according to either of the previous embodiments and has a transmitter comprising, in place of a physical oscillator, a signal synthesizer having means arranging an input sequence into N-bit blocks and for selecting and generating one of $2^N$ waveforms in response. The selected waveform models the N-orbit trajectory of a chaotic oscillator according to the previous embodiments, after the oscillator being nudged to a state that sources a specific N-bit sequence. The selected waveform is output as Xtrans (t) of the previous embodiments.

Another embodiment of the invention is a system having a transmitter according to the previous embodiments, with a receiver comprising a plurality of $2^N$ chaotic oscillators, and a corresponding plurality of $2^N$ correlators. Each of the $2^N$ chaotic oscillators is constructed to generate a corresponding one of the $2^N$ possible bit sequences that can occur in the N-bit blocks encoded by the transmitter. A control means periodically forces all of the $2^N$ oscillators and correlators to a respective start position. After subsequent correlation time, selection means detects, based on the correlator outputs, which of the $2^N$ oscillators that the received signal correlates closest to and generates the N-bit sequence associated with that oscillator. This embodiment is essentially a maximum likelihood estimator. The output of the 2N correlators is then used to set the state of the receive predictive oscillator to be close to that of the transmitter with maximum likelihood.

BRIEF DESCRIPTION OF THE DRAWINGS

The foregoing and other objects, aspects, and advantages will be better understood from the following description of preferred embodiments of the invention with reference to the drawings, in which.

DETAILED DESCRIPTION OF THE EMBODIMENTS

Figure 1:
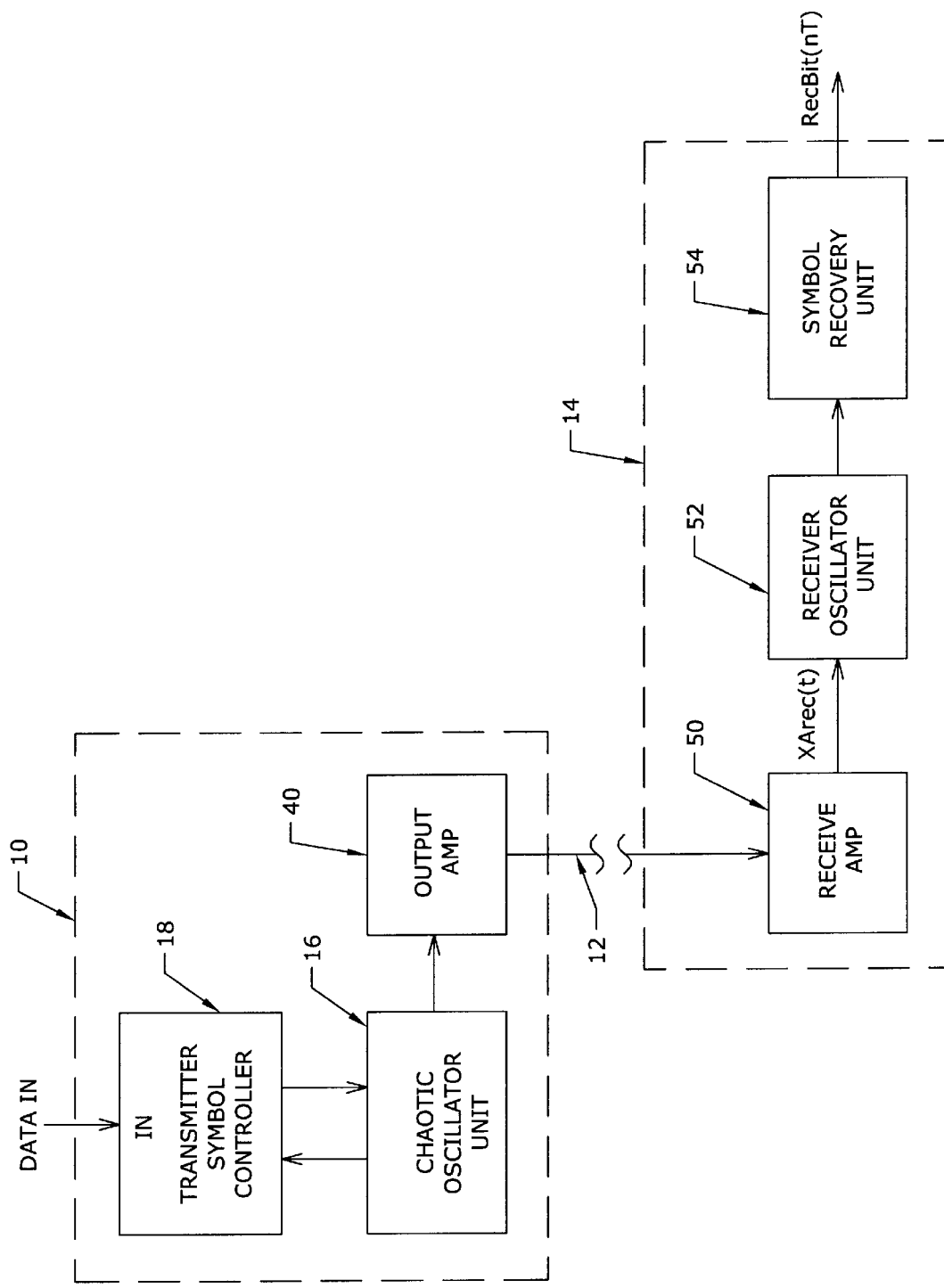
FIG. 1 is a block diagram of a communication system according to one embodiment of the invention.

A first example embodiment of the invention will be described in reference to FIGS. 1–5. FIG. 1 is a block diagram of this example embodiment, comprising a symbol transmitter 10, a communication channel 12, and receiver/symbol reconstructor 14. The symbol transmitter 10 comprises a transmitter chaotic oscillator unit 16, a transmitter symbol controller 18, and an output amplifier 40.

Figure 2:
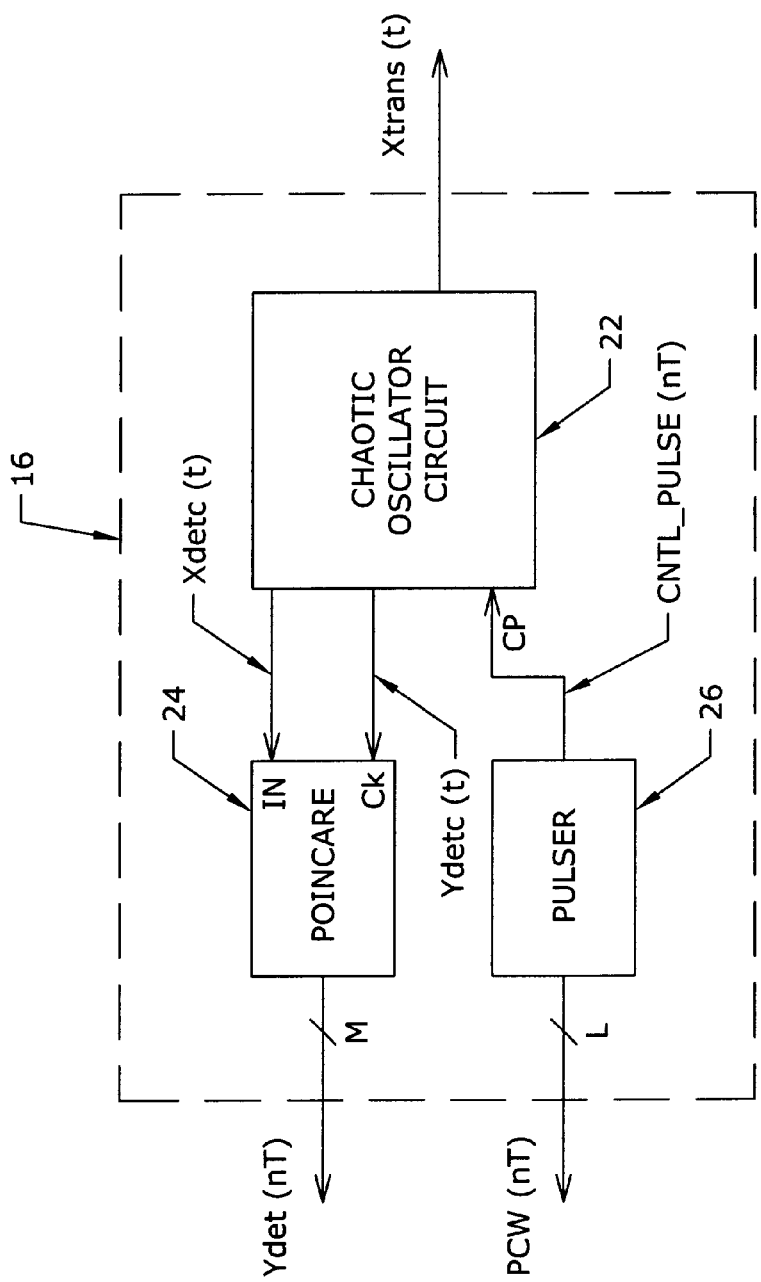
FIG. 2 is a top level block diagram of a transmitter chaotic oscillator unit of the FIG. 1 embodiment.
Figure 3:
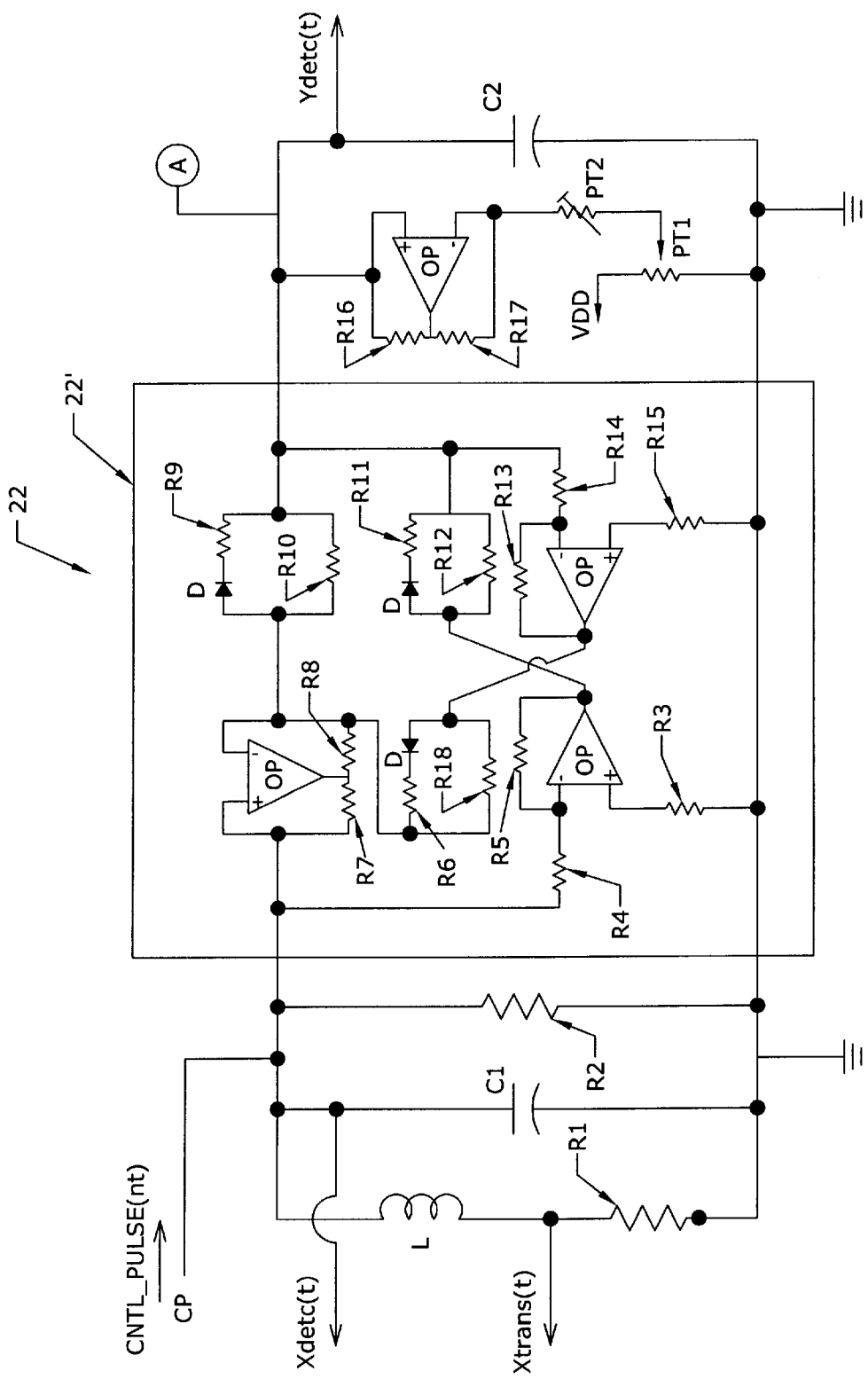
FIG. 3 is an example circuit diagram of a Lorenz type chaotic oscillator unit of FIG. 2.
Figure 4:
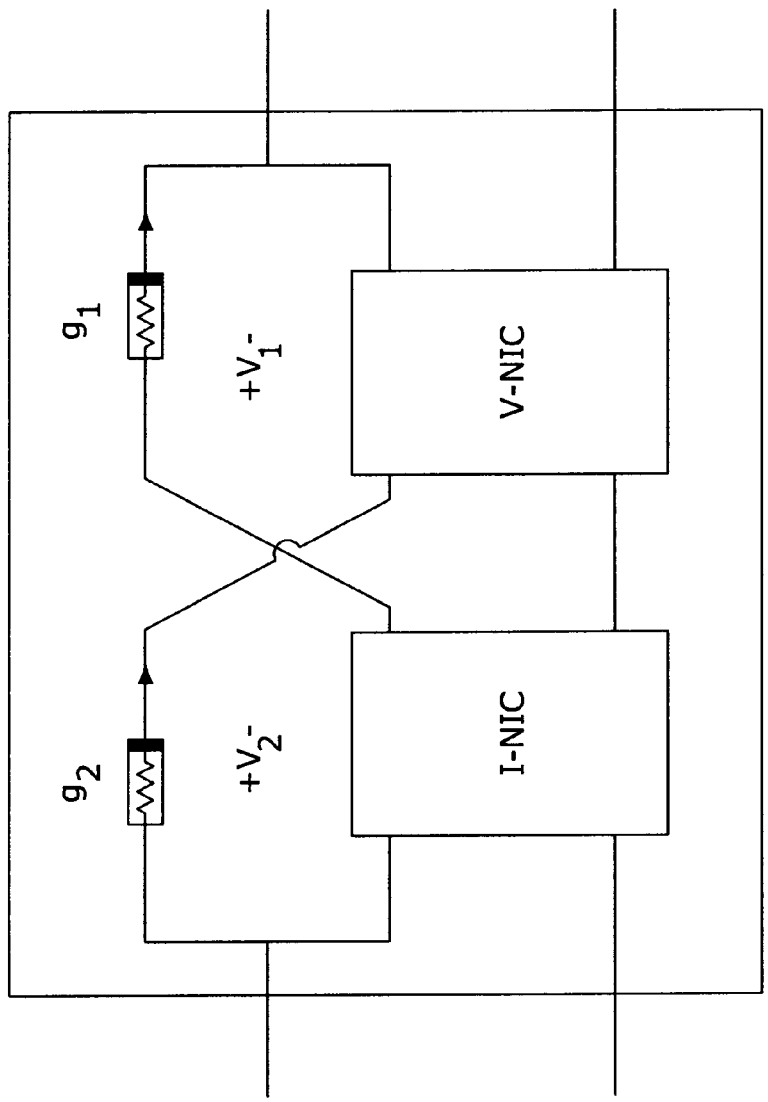
FIG. 4 is an example circuit model of the FIG. 3 circuit.
Figure 5:
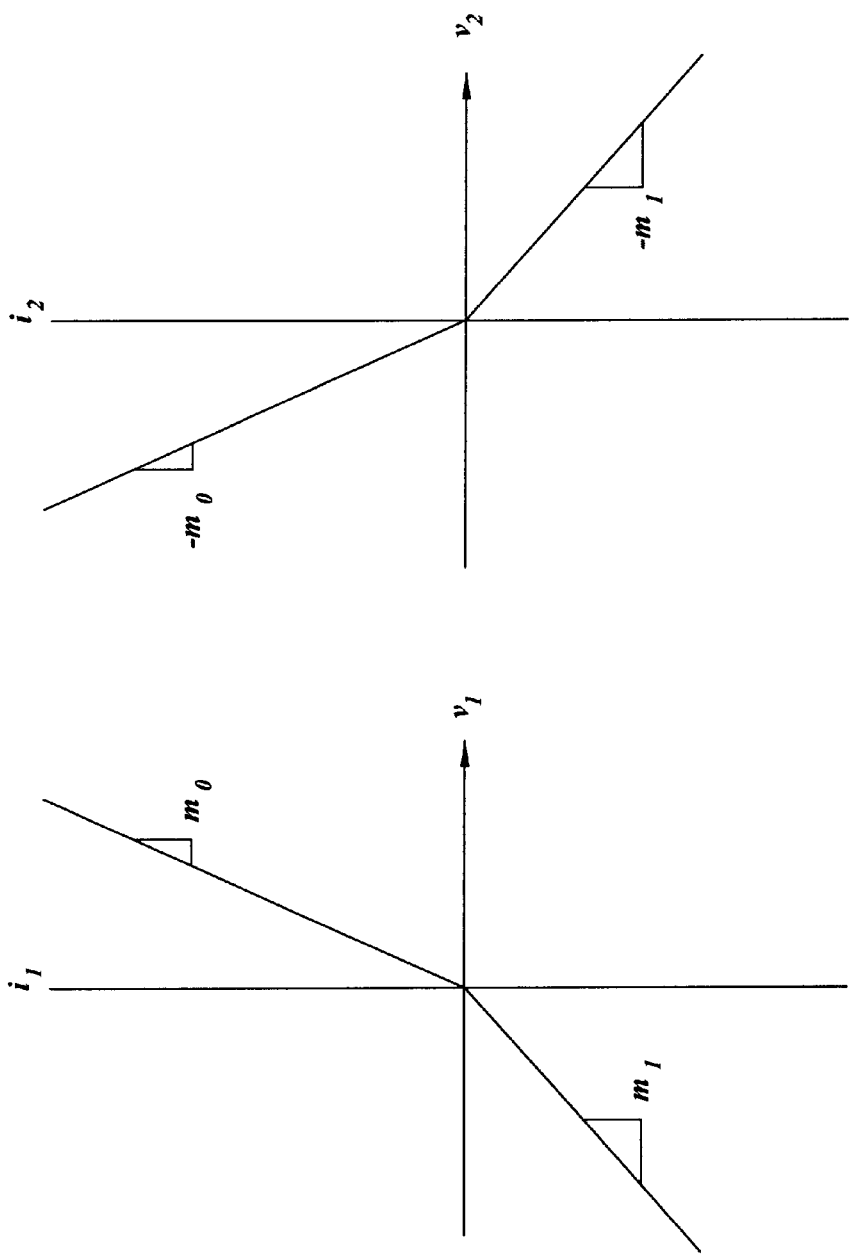
FIG. 5 is an example voltage versus current plot of an element of FIG. 4.
Figure 6:
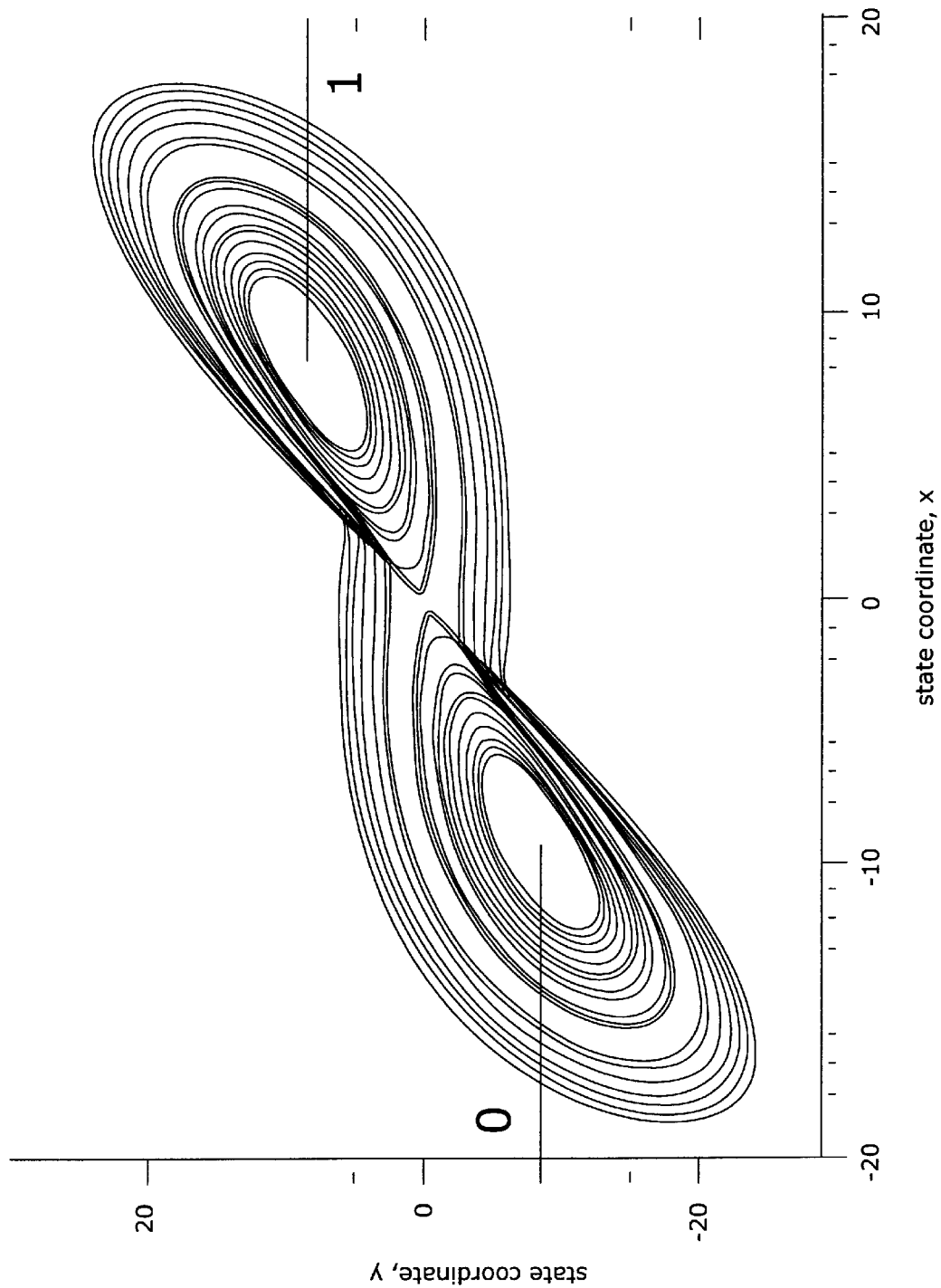
FIG. 6 is a state-space model of a Lorenz attractor characteristic of a circuit according to FIG. 3.

Referring to FIG. 2, the transmitter chaotic oscillator unit 16 comprises a chaotic oscillator circuit 22, a Poincare sampler 24 and a pulser 26. An example chaotic oscillator circuit 22 for this embodiment is shown by FIG. 3, and a higher level model of the same is shown by FIGS. 4 and 5. The circuit of FIG. 3 is an example Lorenz type chaotic oscillator having a free-running behavior of the form shown by FIG. 6. The axes and plots of FIG. 6 are discussed further below.

Referring to FIG. 3, the example oscillator circuit 22 is formed of four operational amplifiers OP, three diodes D, a plurality of resistors R1 through R18, a capacitor C1 and a capacitor C2, an inductor L, and two potentiometers PT1 and PT2. Vdd for the particular example is 3 volts. The operational amplifiers are standard commercially available units and, for this example circuit 22, are generic type "318", available from various vendors. The diodes for the FIG. 3 example are generic type 1s1588. Potentiometer PT1 is a generic three terminal 100 kΩ device and potentiometer PT2 is a generic two terminal or equivalent device ranging up to 10 kΩ. The other element values, for this example, are: L=13 mH; C1=6.8 nF; C2=47 nF; R1=1.2 kΩ; R2=0.8 kΩ; R3=R15=50 kΩ; R4=R5=R13=R14=100 kΩ; R6=R11=R9= 1.0 kΩ; R7=R8=R16=R17=0.27 kΩ; R10=R12=R18=1.8 kΩ. The oscillating frequency of the FIG. 3 circuit is 1 KHz.

The section 22' of the FIG. 3 circuit can be modeled, for example, by the equivalent circuit shown by FIG. 4, comprising two piecewise non-linear resistors g1 and g2, and two negative resistance elements shown as I-NIC and V-NIC negative resistance elements. The piecewise non-linear resistors g1 and g2 are modeled according to the voltage versus current characteristic $v_1$-$i_1$ and $v_2$-$i_2$ shown on the v-I plots of FIG. 5, where $m_0 \neq m_1$.

The Lorenz behavior of the oscillator circuit 22 of FIG. 3 and the apparatus for its control will now be described.

Referring to FIGS. 3 and 6, the voltage across capacitor C1 is selected as the Xdetc(t) basis vector of the state space and the voltage across capacitor C2 is selected as the Ydetc(t) basis vector. This is for purposes of example only. As known to one of skill in the art of chaos theory, there is a plurality of voltage and current states of various sub-sets of the depicted elements of FIG. 3 which can be selected as basis vectors for a state space describing the circuit's behavior.

Referring to FIGS. 1, 2, 3 and 7, the Poincare sampler 24 receives the Xdetc(t) signal on its input sample port IN, and receives the Ydetc(t) signal on its clock port CK. A sample trigger circuit (not shown) in the Poincare sampler 24 triggers an M-bit quantized sampling of the Xdetc(t) signal on the IN port based on a pre-determined Ytrigger state of the Ydetc(t) signal on its clock port CK. Referring to FIG. 6, Ytrigger is the polarity transition of the Ydetc(t) signal occurring along the example Poincare surfaces PS0 or PS1 of the attractor state space. Based on the Ytrigger sample timing, the quantized sample Xdet(nT) output from the Poincare sampler 24 represents the Xdetc(t) component of the oscillator circuit 22 state trajectory ST where it pierces the Poincare surface PS0 or PS1. Based on known chaos theory, the Xdetc(t) component of the state vector at the Poincare surface is sufficient to uniquely define which band of the attractor that the state vector is on, thereby eliminating, for this embodiment, storage of values representing the vector's Ydetc(t) component.

The Poincare sampler 24 of this example embodiment can be built with a standard commercial eight-bit analog-to-digital (A/D) converter (not shown), with the sample trigger circuit (not shown) being, for example, a standard phase-lock-loop edge-based clock recovery circuit using the Ytrigger value as the edge. Alternatively, instead of a phase-lock-loop, the sample trigger could be at Ydetc=zero volts. The sample rate is 1/T, where T is the input bit period. The bit rate of this example embodiment, based on the values for the example Lorenz oscillator of FIG. 3, is 1 Kbit/second, and eight-bit A/D converters having that sample rate are commercially available from numerous vendors. It will be understood, however, that the example eight-bit resolution and sample rate of the Poincare sampler 24 are for purposes of description only, as the actual resolution and sample rate are a design choice selected according to the desired system communication performance.

Figure 7:
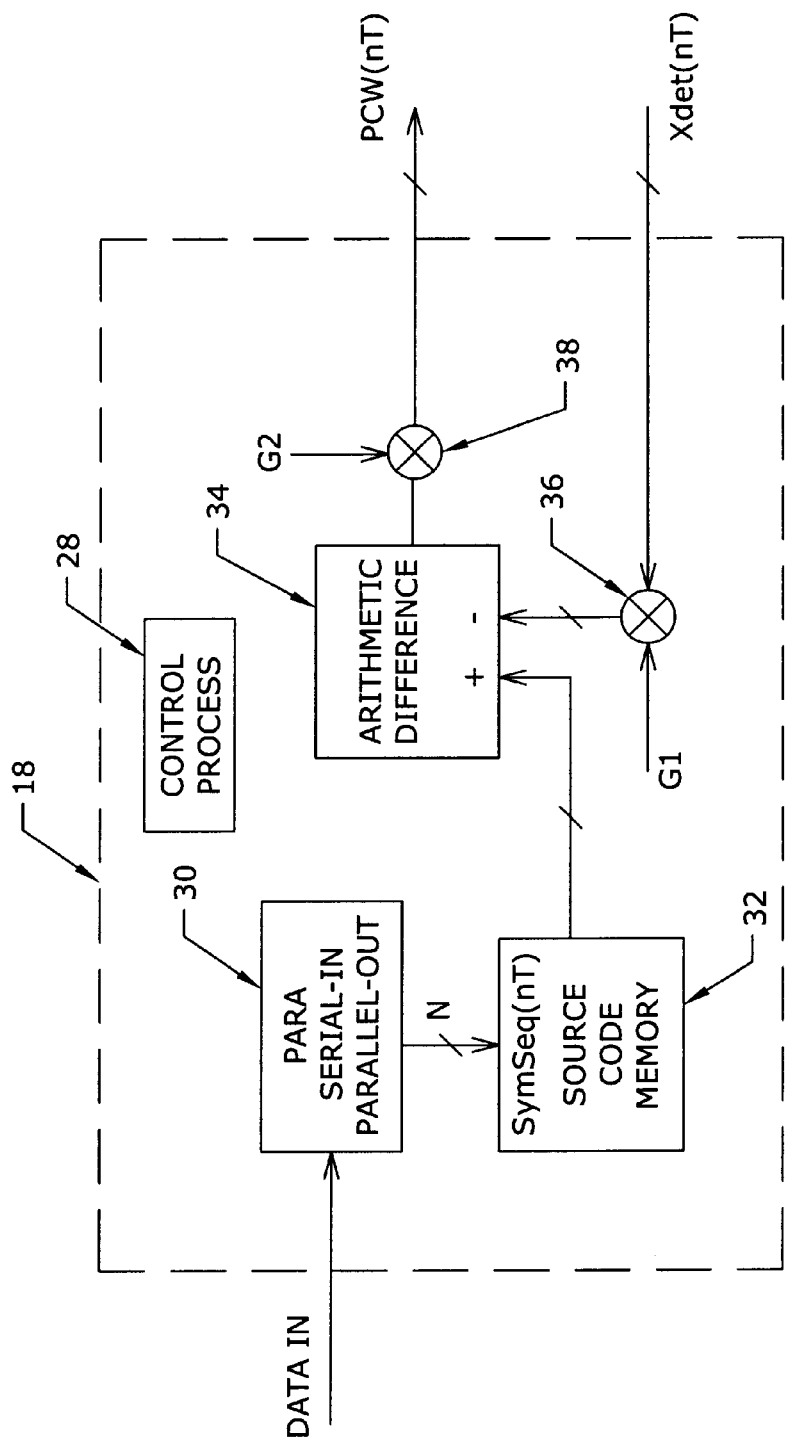
FIG. 7 shows an example block diagram of a transmitter symbol controller block of the FIG. 1 embodiment.

Referring to FIGS. 1 and 7, the example transmitter controller 18 of this embodiment receives at port IN an input stream of encoded date DATAIN which, for example, can be a binary bit stream. Header information, multiplexing data, and any other format-related matters associated with the input data stream are not relevant to the operation or structure of this invention and, accordingly, will not be addressed. The example transmitter controller 18 of FIG. 7 comprises a control processor 28, a serial in/parallel out buffer 30, a source code memory 32, an arithmetic difference unit 34, a first calibration multiplier 36 and a second calibration multiplier 38. An alternative embodiment could be constructed without the calibration multipliers 36 and 38, provided that the circuitry generating Xdet(nT) and arithmetic difference from unit 34 are designed specifically for the voltage ranges that occur in the oscillator.

It is emphasized that blocks 28, 30, 32, 34, 36, and 38 represent functional blocks, and are not limited to being implemented as separate hardware units. The transmitter controller 18 may, for example, be a standard commercial single board or single package microprocessor having a central processing unit (not shown), a program memory (not shown) and a data RAM (not shown) and standard the I/O features generally found on such commercial units.

The transmitter controller's processor 28 and serial-in/parallel-out buffer 30 are programmed or constructed to arrange the input date stream into N-bit blocks by a sliding window operation. The input data stream is clocked into the serial-in /parallel-out buffer 30 at a rate of 1/T. The parallel output, referenced herein as SymSeq(nT), n being an index conforming with the Cntl_Pulse(nT) and PCW(nT) timing, addresses the source code memory 32. The source code memory 32 is pre-loaded with $2^N$ Xsource(N) words, each Xsource (N) corresponding to an interval on the transmitter oscillator circuit 22 Poincare surface PS0 or PS1 of FIG. 6 from which the next N orbits correspond, as to which focus or lobe L0 or L1 of the attractor, to the bit sequence occurring within the N-bit block. This Xsource(N) interval is the interval that "sources" the desired N-bit symbol stream. More particularly, although the bit sequence is random under classical analysis, the trajectory of the oscillator circuit 22 on the Lorenz attractor of FIG. 6 is, under known chaos theory, deterministic. Further, the trajectory can be represented in terms of which of the two foci L0 and L1 it is orbiting. The state vector always orbits a focus for an integer number of cycles and, in a manner that is random by classical analysis, transitions to the other focus and orbits for another integer number of cycles. For this description, the orbit of the oscillator 22 state vector around focus L0 will be termed a "0" state, and the orbit around L1 will be a "1" state. The trajectory of the oscillator 22 circuit, or any other Lorenz oscillator, when mapped according to which attractor focus it cycles around, therefore becomes an infinite random sequence of "1"s and "0"s. Thus, by definition, any N-bit sequence of "1"s and "0"s exists somewhere in the set of possible orbits of oscillator 22 when free running on its Lorenz attractor.

Referring to FIG. 6, it is seen that there are multiple bands of the attractor, and two examples are labeled as Band1 and Band2.

It should be noted that one cannot actually "see" the bands on the uncontrolled attractor. The banded structure is caused by using a run length constrained code. If one does not use a run length constrained code there are still bands that can be associated with finite length symbol sequences, but the bands are not physically separated in the state space.

Referencing again to FIG. 6 and to the Poincare surface PS0, each of the bands has a width $\epsilon$. Each of the $2^N$ Xsource(N) words stored in the source code memory 32 represents an attractor band of FIG. 6, such as Band1 and Band2, and the number of bits of Xsource(N) corresponds to the width $\epsilon$. Since the Lorenz attractor is deterministic then, if the oscillator 22 state vector is forced to being, for example, in Band1, it is known that its state vector will orbit foci L0 and L1 in a certain sequence for N cycles. As stated above, N is inversely proportional to the width $\epsilon$, i.e., the number of bits in the source code words Xsource(N).

The controller 18 of the present embodiment forces the oscillator circuit 22 to a state sourcing the sequence of the foci L0 and L1 corresponding to the SymSeq(nT) as follows:

The transmitter controller 18 receives the quantized M-bit Xdet(nT) data from the chaotic oscillator unit 16, and multiplies it at the first calibration multiplier 36 by a first scaling factor G1, to normalize it with respect to the Xsource (N) values. G1 is predetermined at time of manufacture or can be generated by a calibration program readily formulated by one of ordinary skill and loaded into the control processor 28. The normalized Xdet(nT), (not numbered) is input to one operand port, labeled as "−", of the arithmetic difference unit 34. The N-bit word in the input buffer reads a corresponding Xsource(N) from the source code memory 32, which is input to the other operand port of the arithmetic difference unit 34. The arithmetic difference (not numbered) is input to the second calibration multiplier 38, where it is multiplied by a second scaling factor G2 to generate a pulse control word PCW(nT) for transmission to the pulser 26. G2 is predetermined or generated by a calibration program as described for G1.

The pulser 26, generates a pulse control signal Cntl_Pulse(nT), based on the value of PCW(nT), which is input to the control port CP of the chaotic oscillator 22 of FIGS. 2 and 3. Alternatively, Cntl_Pulse(nT) can be connected to terminal point A of FIG. 3, as well as other connection points of the FIG. 3 circuit. The Cntl_Pulse(nT) signal, having a magnitude and polarity calculated as described above, forces the chaotic oscillator 22 to an interval on either of the Poincare surfaces PS0 and PSI shown on FIG. 6 which sources the N-bit sequence in the controller buffer 30.

As described above, the example controller 18 of this embodiment arranges the input data stream to buffer 30 in an N-bit sliding window manner. The index n and period T of the Cntl_Pulse(nT) is the same index used herein for input data stream to buffer 30. Therefore, for this embodiment, the N-bit word SymSeq((n+1)T) is a one bit shifted version of SymSeq(nT).

Referring to FIGS. 1 and 3, the example system is shown with an amplifier 40 which receives the Xtrans(t) voltage across the resistor R1 and outputs a corresponding amplified signal XAtrans(t) to an input of the communication channel 12. For this example, the signal XAtrans(t) is baseband. However, this is not a limitation, as the XAtrans(t) could, if desired, be used to modulate a carrier wave by any of the various conventional modulation schemes, such as AM, or FM. Further, the communication channel 12 is, for purposes of this description, an electrical wire. However, the communication channel 12 could, for example, be a fiber optic cable with appropriate photoelectric interface hardware (not shown) at the ends of the channel 12.

Figure 8:
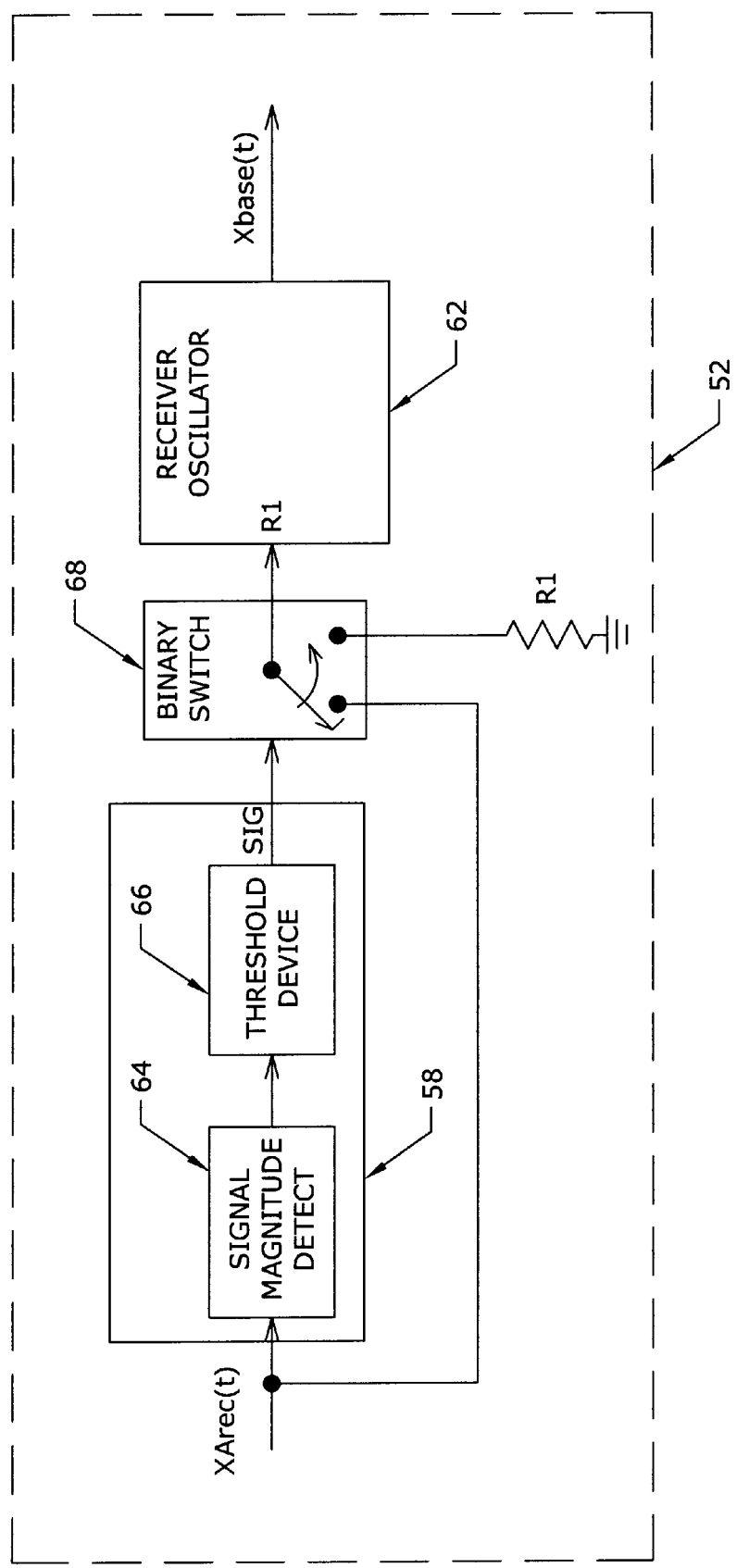
FIG. 8 is an example block diagram of a synchronizing chaotic oscillator unit of the receiver of the FIG. 1 embodiment.

Referring to FIGS. 1 and 8, the receiver 14 of this embodiment includes a line interface 50 for receiving Xrec (t), which is the XAtrans(t) signal after attenuation and corruption through the channel 12, and outputting an amplified signal XArec(t), a synchronizing chaotic oscillator unit 52, and a bit recovery unit 54. FIG. 8 shows a detailed block diagram of the synchronizing chaotic oscillator unit 52, comprising a signal integrity estimator 58, a binary coupling control, or switch, 68, and a receiver chaotic oscillator 62. The receiver chaotic oscillator 62 is substantially identical to the transmitter oscillator circuit of FIG. 3. Description of the oscillator 62 is therefore according to the reference numbers of FIG. 3.

The signal integrity estimator 58 and the variable coupling control 68 function to connect the XArec(t) signal to the R1 resistor of the oscillator circuit 62 if XArec(t) is above a pre-determined threshold TR, and to disengage the oscillator's R1 resistor from XArec(t) and, instead, connect R1 to a load resistor R1' if XArec(t) is below the threshold.

By this operation, the receiver oscillator circuit 62 will be connected to, and will quickly lock up to, the transmitter oscillator 22 when the Xrec(t) signal is available but, since the receiver oscillator 62 is structured to oscillate on a Lorenz attractor substantially identical to that of the transmitter oscillator 22, will after having locked continue to free run on the same trajectory as the transmitter oscillator 22 for at least N orbits when disengaged from a corrupted or noisy Xrec(t). The number N is not fixed but, instead, depends on noise and other inaccuracies in the system.

Referring to FIG. 8, an example signal integrity estimator 58 and binary variable coupler 60 comprise, respectively, a magnitude detector 64, a threshold detector 66 outputting one a binary SIG signal, the binary controlled switch 60, and a load resistor R1'. The magnitude detector 64 is a standard circuit element which, for example, calculates the absolute value or the square of the XArec(t) signal. The threshold detector 66 is a conventional circuit element which outputs a binary signal SIG to the binary controlled switch 68. When SIG is, for example, a "0", the switch 68 connects the resistor R1 of the oscillator circuit 62 to the output signal XArec(t) of the receiver amplifier 50. When SIG is, for example, a "1", the switch 68 connects the resistor R1 of the oscillator circuit 62 to the load resistor R1'.

As stated above, the receiver oscillator 62 of this embodiment is identical to the transmitter oscillator 22 of FIG. 3. The voltage across the capacitor C2 of the receiver oscillator 62 serves, for this example, as the oscillator sampling point and is output as Xbase(t) to the symbol detector 54 of FIG. 1.

Figure 9A:
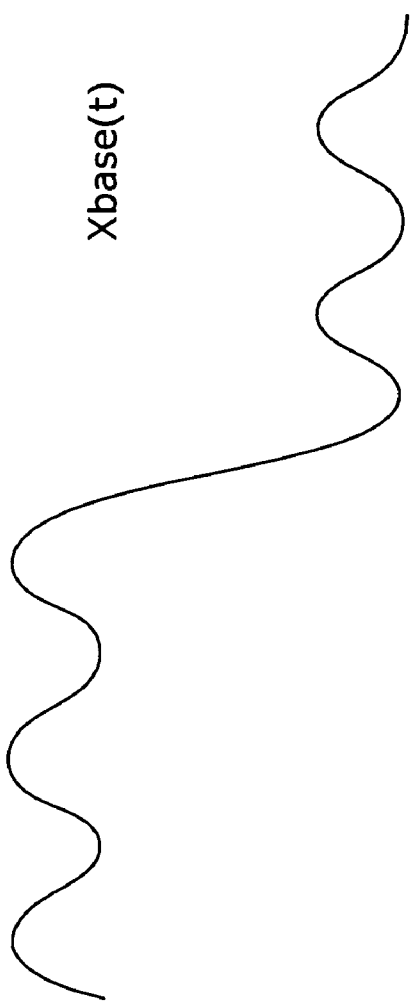
FIG. 9A depicts a typical wave form of an example symbol detector.
Figure 9B:
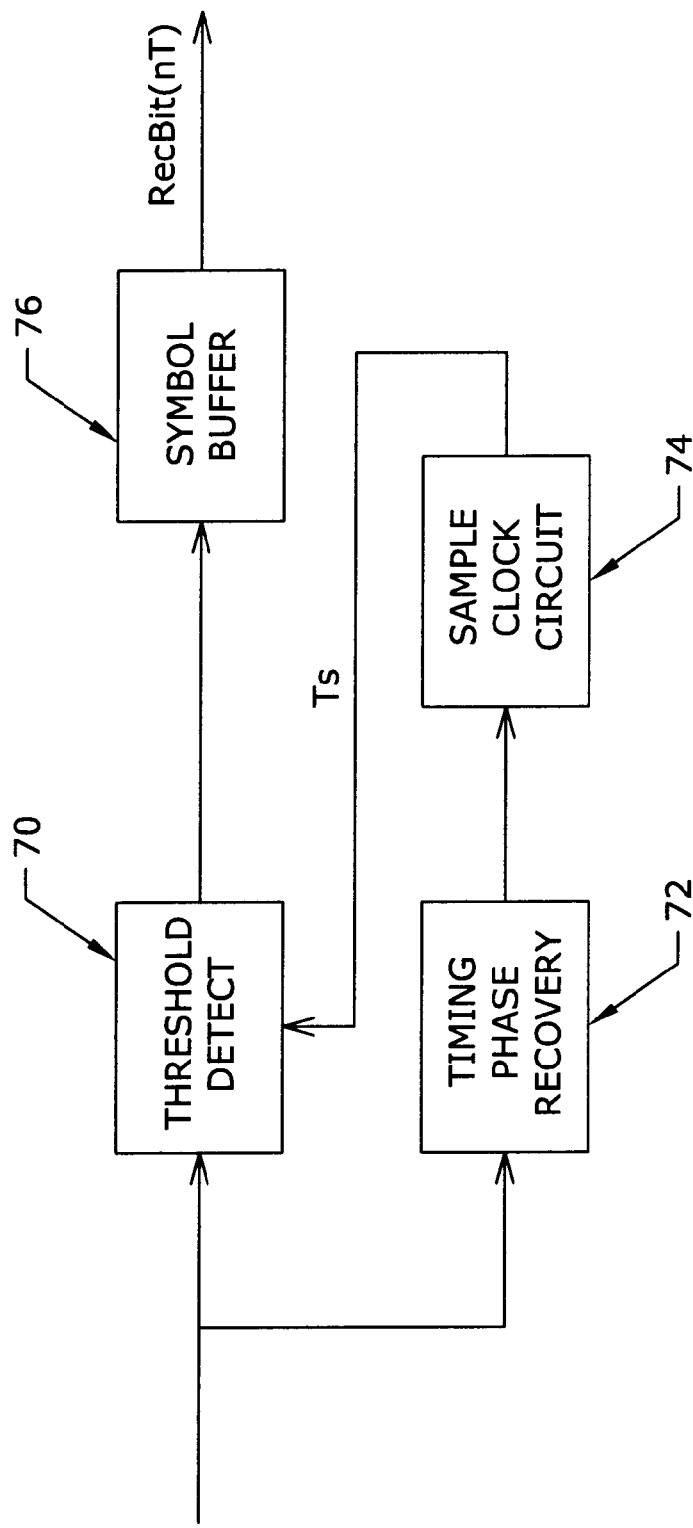
FIG. 9B is an example block diagram of a symbol detector unit of the receiver of the FIG. 1 embodiment.

An example symbol detector 54 is shown on FIGS. 9A and 9B, where 9A shows a typical waveform of the baseband signal Xbase(t). The FIG. 9B example circuit comprises a threshold detector 70, a timing phase recovery circuit 72, a sample clock circuit 74 and a symbol buffer 76. The threshold detector 70 outputs a RecBit(nT) signal as a binary 0 if Xbase(t)<0 and a binary 1 if Xbase(t) is >0. Referring to the FIG. 9A waveform, and to the Lorenz attractor's state space of FIG. 6, it can be seen that the binary output of the threshold detector 70 corresponds to which focus, L0 or L1, that the receiver oscillator 62 state vector is in. Various implementations of the timing phase recovery circuit 72 are known in the art of communication circuit design, including phase lock loop (PLL), signal squaring, zero crossing estimation, and other well-known methods of signal clock estimation. The timing phase circuit 72 controls the sample clock circuit 74 to align the sample clock output Ts such that the clock Ts causes the threshold detector 70 to sample and threshold the Xbase(t) signal in phase with the receiver oscillator circuit 62. The symbol buffer 76 holds the symbol stream of RecBit(nT) until the "user" extracts bits. The "user" can be any digital receiving apparatus.

Figure 10:
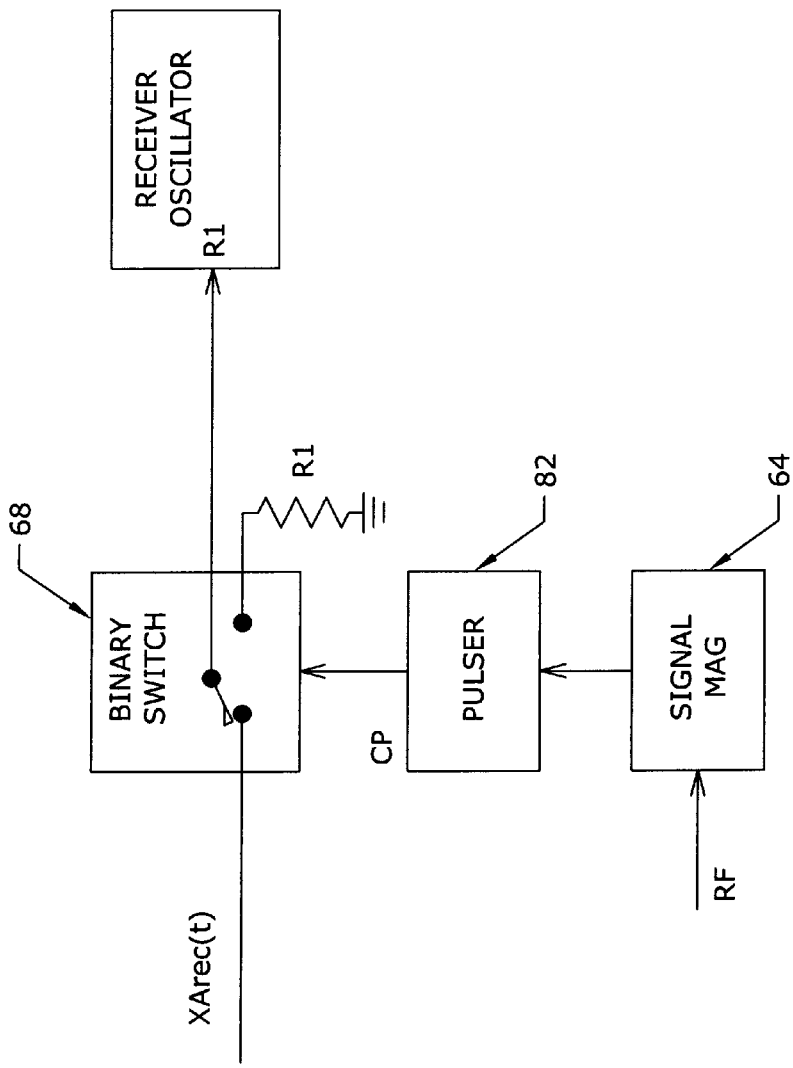
FIG. 10 shows another embodiment of a synchronizing chaotic oscillator unit of FIG. 1, having a continuously variable coupler.

FIG. 10 shows a continuously variable coupler 80 alternative to the binary variable coupler 68 of FIG. 8. The FIG. 8 circuit, although simple in construction, is preferred for "all or nothing" dropouts. Further, the circuit of FIG. 8 assumes a baseband signal, which does not generally provide adequate time for a conventional automatic gain control circuit (AGC) to operate. However, this invention can employ a modulation/demodulation scheme (not shown), in which the signal XAtrans(t) modulates an radio frequency (RF) carrier and the receiver 14 has a demodulator (not shown) for outputting XArec(t). The carrier strength of the RF signal can then be used as measure of signal integrity. Therefore, for this and other applications, one can employ an AGC type continuously variable coupling between XArec(t) and the receiver oscillator 62, such as the example of FIG. 10.

For the FIG. 10 unit, a magnitude detector 64, as described for FIG. 8, receives the RF carrier and outputs a MAG signal to a coupling pulser 82. The coupling pulser 82 outputs a coupling pulse CP having a width W (not shown) proportional to the RF strength indicating signal MAG. The frequency of the CP pulse is preferably greater than 100 times the baseband symbol rate 1/T. A binary switch 68, as described for FIG. 8, receives CP and switches the resistor R1 of the receiver oscillator 62 to the load resistor R1' when CP is low and to the Xbase(t) baseband signal output from the RF demodulator (not shown) when CP is high. Since CP width W is continuously variable, the percentage of time that the receiver oscillator 62 is coupled to the incoming signal Xbase(t), is continuously variable.

Referring to FIGS. 1–10, it is envisioned that the above-described embodiments may preferably use, for some applications, a run-length encoding scheme on the input data DATAIN to the transmitter symbol controller 18. A run-length encoding may, based on estimates of present hardware, reduce a possibility of system or other noise causing the transmit oscillator 22 or the receive oscillator 62 to switch to the wrong lobe or focus L0 and L1 of the attractor.

Many methods for implementing a run-length constrained code are known in the art. However, there is a further embodiment of this invention for a run length constrained code, which prevents the transmitter oscillator 22 from ever executing more than two cycles in a row on either lobe L0 and L1 of the attractor. The embodiment is as follows: Consider the input bitstream to represent switches of the oscillator 22 attractor lobe, that is, a "0" means that the oscillator will stay on the same lobe, and a "1" means to switch. Next, perform a translation in the input bitstream of 0→01 and 1→1. This can be readily accomplished, for example, by a program change to the commercial processing unit implementing the controller 18. This changes each "0" to the block "01", and each "1" to the block "1" (no change). This simple variable-length block code will change the bitstream to a new bitstream in which the statepoint, referring to FIG. 6, never stays on the same lobe of the attractor more than one more cycle after executing a Poincaré crossing over PS0 or PS1. The above-described variation confers a further benefit, in that if the receive oscillator 62 goes of sync and begins to track an opposite bit sequence (bitwise complement), there is only one decoding error.

Figure 11A:
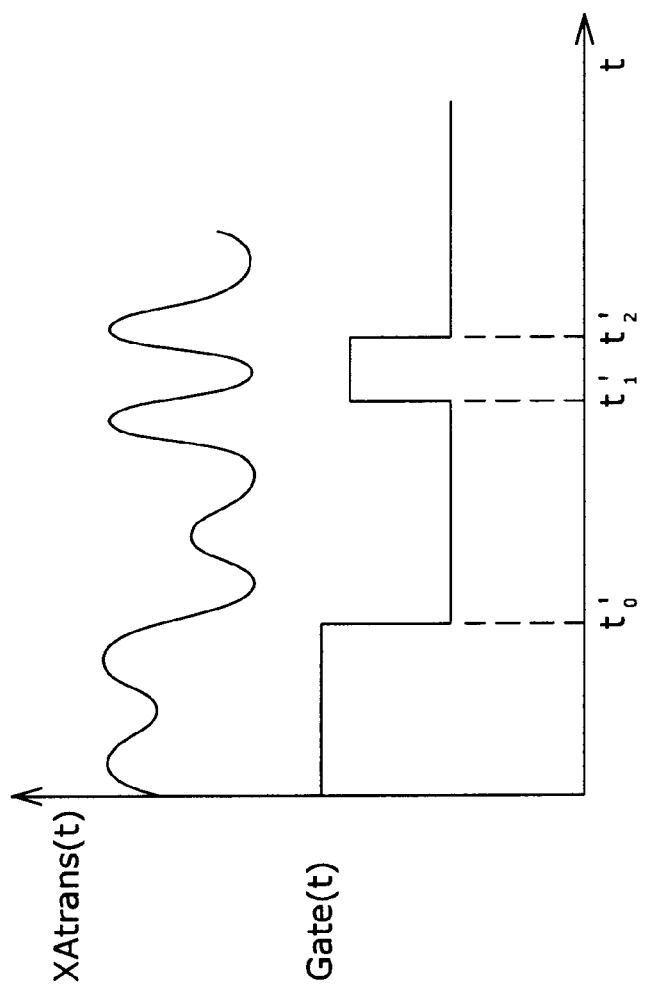
FIGS. 11A, 11B and 11C show, in order, a transmitted Lorenz oscillator signal from an embodiment according to FIGS. 1–10, having a run length constrained code input, the received signal at an input of the receiver having dropouts, and the reconstructed signal at an output of the receiver.
Figure 11B:
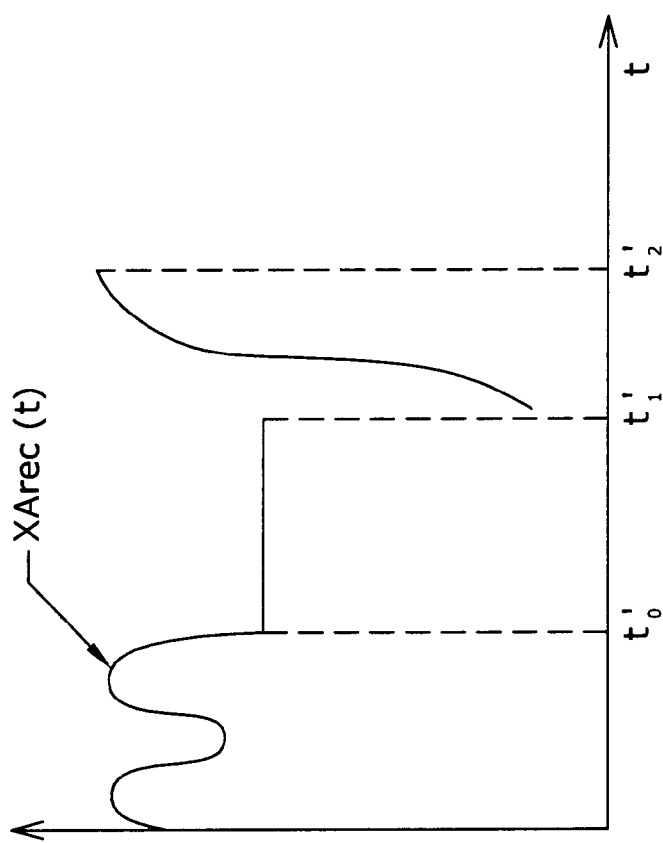
Figure 11C:
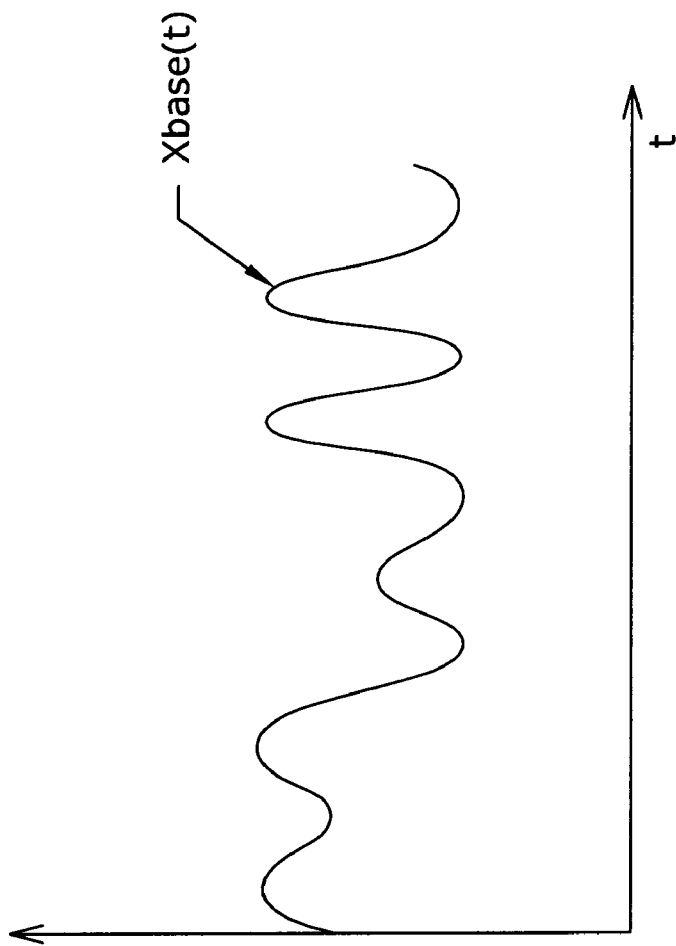

FIGS. 11A shows a transmitted Lorenz oscillator signal XAtrans(t) from an embodiment according to FIGS. 1–10, having a run length constrained code as described above. The depicted waveform XAtrans(t), as apparent to one of ordinary skill in the art, is a schematic representation of the Lorenz waveform and is not intended to represent accurately the pulse amplitudes. The waveform shown as Gate(t) is a hypothetical gating signal representing, for example, an intermittent drop out of the channel 12. The time markers t0', t1' and t2' represent a channel drop out, a re-instantiation, and a subsequent drop out. FIG. 11B shows an example received signal XArec(t) at an input of the receiver amplifier 50 having the t0' to t1' dropout, and FIG. 11C shows the reconstructed signal Xbase(t) at an output of the receiver oscillator 62.

Figure 12:
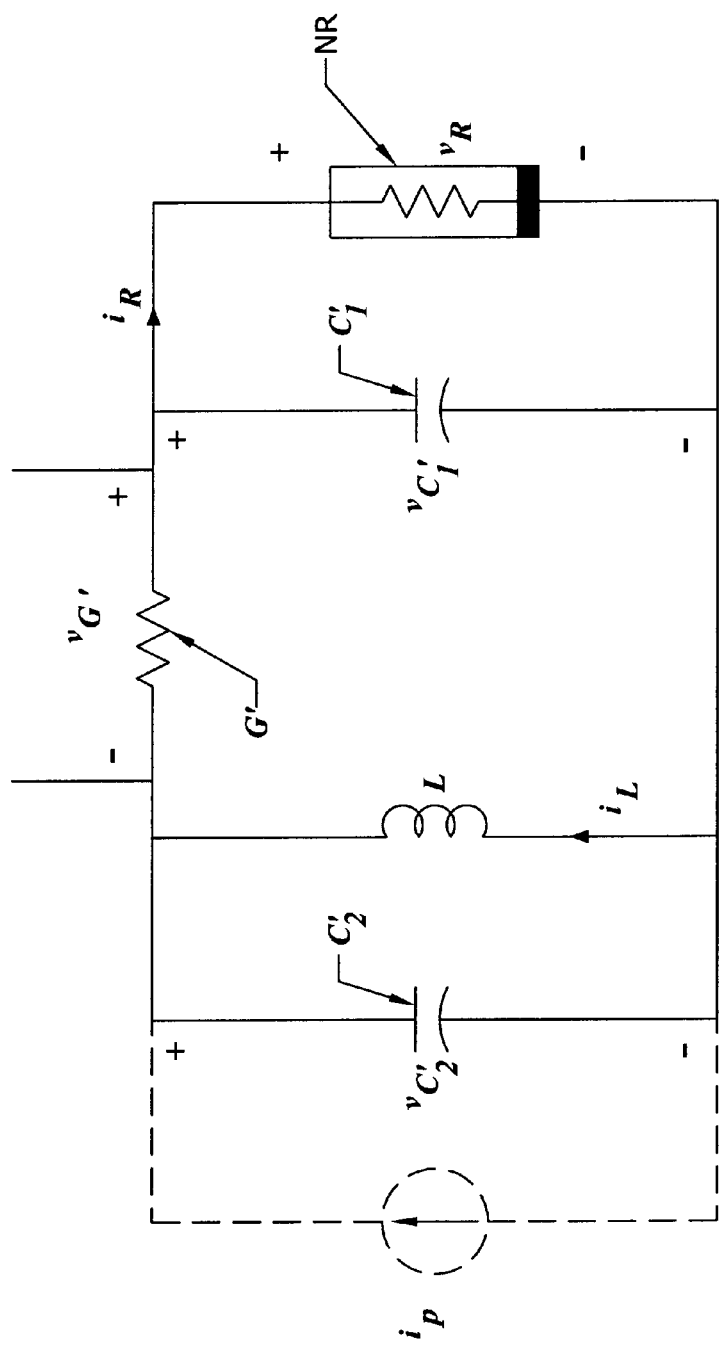
FIG. 12 shows a circuit diagram of a Rossler attractor chaotic oscillator as an alternative to the Lorenz attractor chaotic oscillator of FIG. 3.
Figure 13:
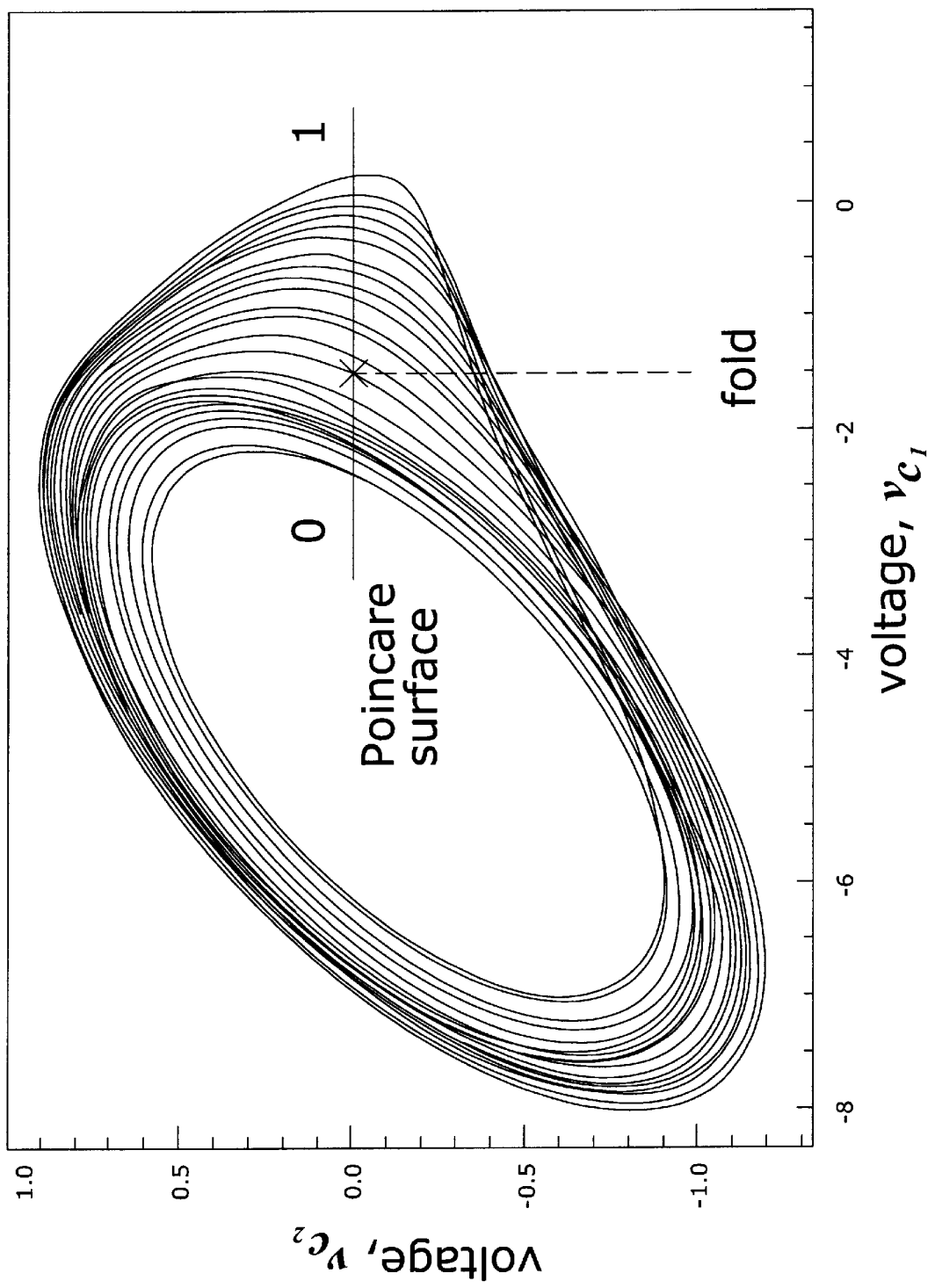
FIG. 13 is a plot of the Rossler type chaotic behavior of the circuit of FIGS. 12.
Figure 14:
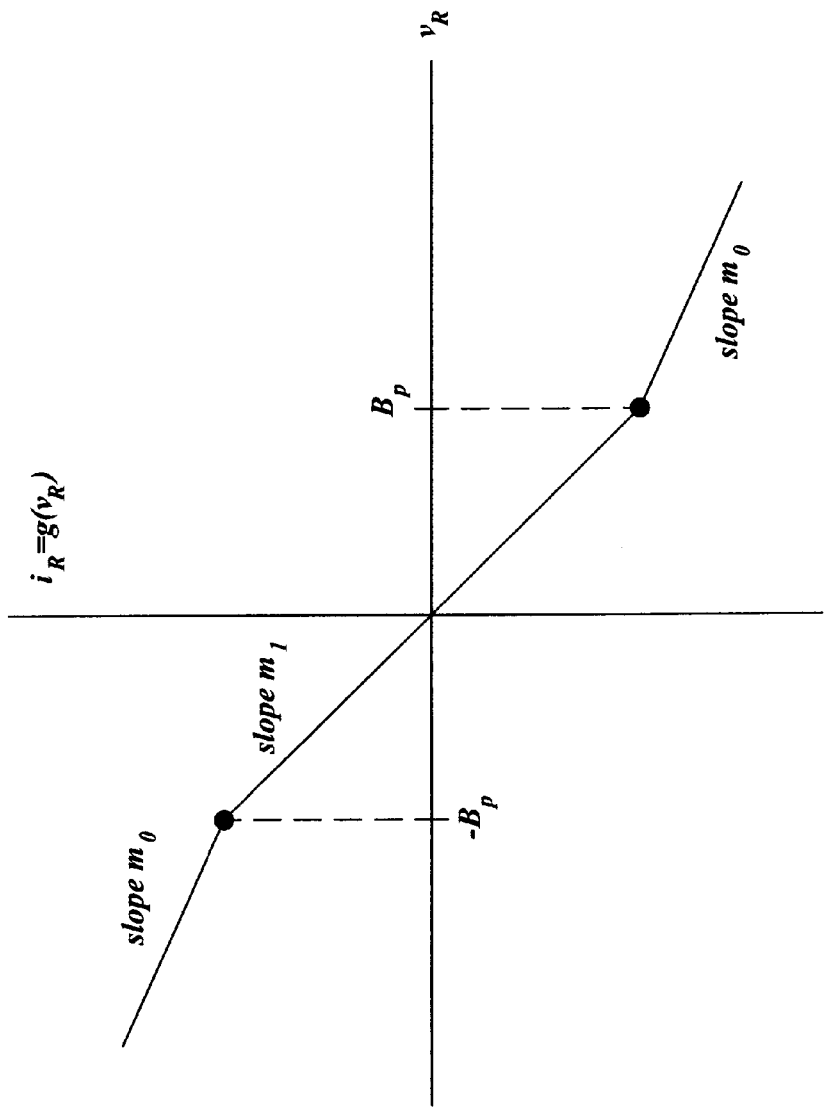
FIG. 14 is a plot of the current versus voltage curve for the negative resistance element of the FIG. 13 circuit.

The embodiments described above show a Lorenz type attractor circuit, as shown in FIG. 3, as an example implementation of the transmitter chaotic oscillator 22 and the receiver oscillator 62. FIG. 12 shows a circuit diagram of a Rossler or "double scroll" attractor chaotic oscillator as an alternative to chaotic oscillators 22 and 62. The FIG. 12 circuit comprises two capacitors C1' and C2', an inductor L', a resistor G', and a negative resistor NR, and oscillates on the Rössler attractor shown by FIG. 13. The FIG. 13 state space uses the voltages across the FIG. 12 capacitors C1' and C2', labeled as VC1' and VC2' as basis vectors. As can be seen from FIG. 13, the Rössler attractor has one lobe but two symbol regions, which correspond to the "0" and "1" about the "fold" bisector of the Poincare surface. FIG. 14 is a plot of the current versus voltage curve for the negative resistance element NR of the FIG. 13 circuit. The Rossler circuit of FIG. 12 is substituted for the Lorenz circuit of FIG. 3, for the above embodiments, by making VC1' the Xdetc(t), VC2' the Ydetc(t), and the voltage across the resistor G' the Xtrans(t).

Figure 15:
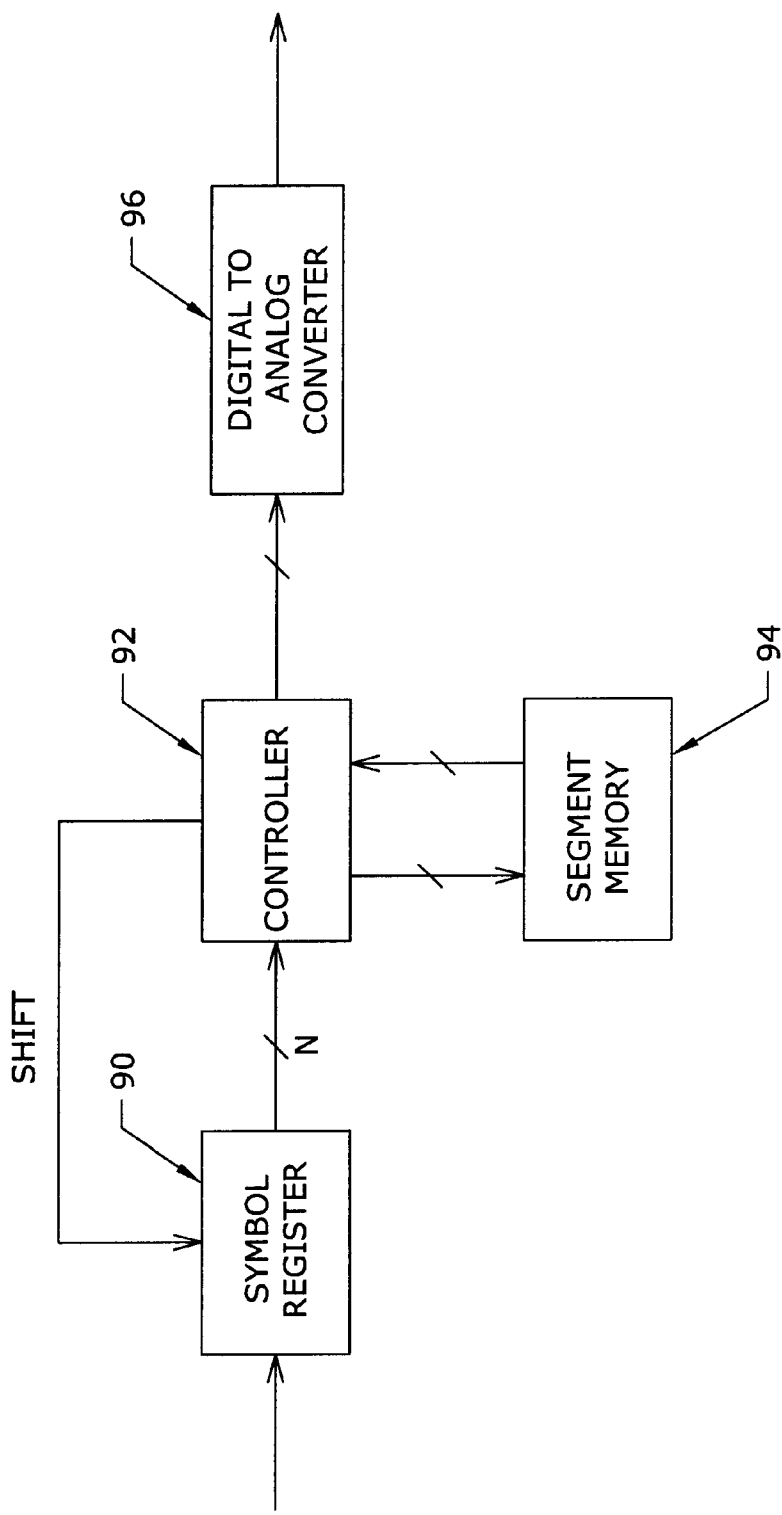
FIG. 15 depicts an alternative embodiment of a transmitter of the present invention comprising a signal synthesizer means, for transmitting an encoded signal to a receiver according to either of the previous embodiments.

The previous described embodiments control the chaotic behavior of an analog transmitter oscillator 22 to generate a symbolic dynamics encoded signal. However, the particular apparatus and method for generating the symbolic dynamics encoded signal is not crucial to the present invention. Accordingly, still another embodiment of this invention replaces the transmitter 10 of Figure with a digital synthesis source 10' such as shown, for example, by FIG. 15. The FIG. 15 digital synthesis source has a sliding block register input 90 which accepts and windows N bits at a time from the input bit stream. The controller 92, which is either a microprocessor or commercial digital signal processing unit or the like, such as used for controller 18 of the previous embodiments, uses the N-bit block from the register 90 to look up a starting point of an M-bit symbol segment stored in a signal segment memory 94. The M-bit symbol segment substantially models a trajectory segment of a chaotic attractor orbiting the attractor's foci in a sequence associated with the N-bit block. The controller 92 then sequentially clocks out the M points from the beginning to the end of the segment, and inputs these to the D/A converter 96. Upon completing the output of the segment, the controller 92 sends a signal SHIFT to the input register to shift in another bit of the input bit stream. The controller then looks up the starting point of the new M-bit segment, and repeats the clocking out process. The segment memory 94 thus contains $2^N$ segments of length M that allow the source to simply read points from memory to the D/A 96 that, in sequence, generate the chaos signal trajectory. The segments of length M are computed using any standard differential equation integrator for the equations of motion being used.

Figure 16:
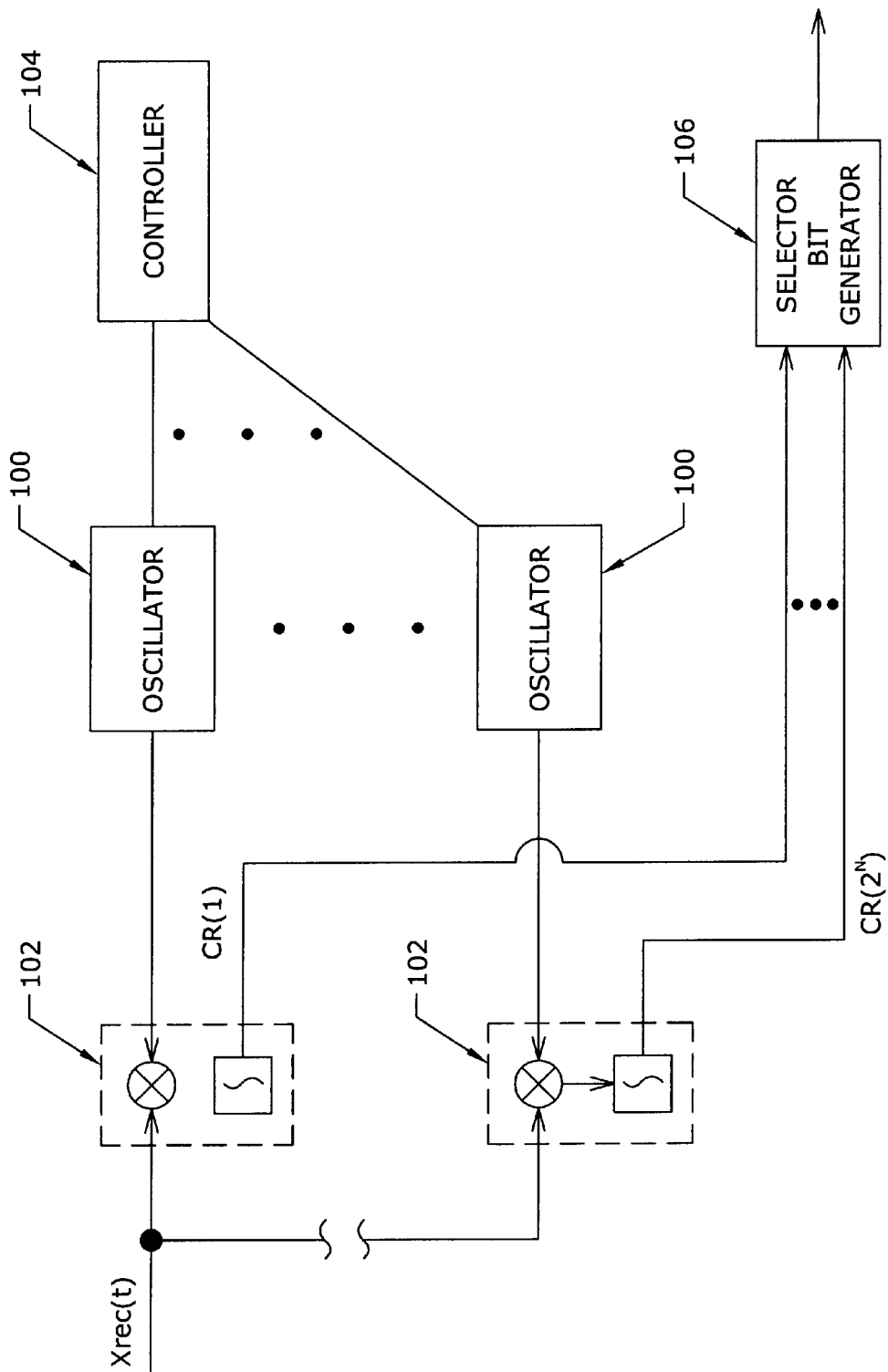
FIG. 16 shows a further embodiment of the invention, having a transmitter according to the previous embodiments, with a maximum likelihood receiver formed a plurality of $2^N$ oscillators and correlators.

Another embodiment of the invention, shown by FIG. 16, is a system having a transmitter according to the previous embodiments, with a receiver comprising a plurality of $2^N$ chaotic oscillators 100, and a corresponding plurality of $2^N$ correlators 102. Each of the $2^N$ chaotic oscillators 100 is constructed to generate a corresponding one of the $2^N$ possible bit sequences that can occur in the N-bit blocks encoded by the transmitter. A group oscillator control means 104 periodically forces all of the $2^N$ oscillators to their start position. Each of the $2^N$ correlators 102 has two inputs and a correlation output. One of the two inputs of each receives the Xrec(t) signal and the other input receives an oscillator signal from a corresponding one of the $2^N$ chaotic oscillators. The correlation output generates, in response to the group control signal, correlation signal CR(n), representing the correlation of the two inputs over the N bit periods, for n=1 to N−1. A selection means 106 detects the maximum CR(n) and generates the N-bit sequence associated with which of the chaotic oscillators provided that maximum. This N-bit most likely sequence is then used to control the receive oscillator to the proper trajectory, by any of the apparatus and methods described previously for controlling the transmit oscillator 22. This embodiment is essentially a maximum likelihood estimator.

An object of the present invention and all of its embodiments described above is to provide a communication system which only receives a transmitted signal for finite periods and which experiences complete or partial signal drop outs, but which can reconstruct the transmitted signal by the receiver's knowledge of the dynamics of the system. The unpredictable nature of the signal would not allow one without knowledge of the transmitter dynamics to do this. FIGS. 11A–11C depict one particularly simple case where the received signal is very low in noise for periods of time and drops out completely during finite time segments. Another more realistic yet simple case is when the received signal fades, and the signal to noise ratio is a function of the degree of fading. This case is provided for by the variable coupling blocks of FIGS. 8, 9 and 10, which couple to the received signal with a coupling constant so that, when the signal is strong, the internal oscillator will track the received signal, when the signal is weak, the internal oscillator will track its own dynamics.

The examples described above will allow an engineer knowledgeable in chaotic dynamics and in electronic circuits to build multiple realizations of this invention. These examples are not a limitation, however. Numerous well-known methods exist for constructing chaotic oscillators that can be used as transmitting oscillators 22. Further methods for controlling an oscillator such as 22 to contain information in the symbolic dynamics are described in U.S. Pat. No. 5,432,697 issued to the present inventor, and in a related application Ser. No. 08/790,238, filed Jan. 28, 1997, are hereby incorporated by reference.

Further, it is seen that the transmit oscillator 22 is controlled by the controller 18 or 92 to, in essence, select from and carry a pre-defined bit sequence occurring within its inherent symbolic dynamics. If one uses the run length constrained code previously described, the state-space density function on the attractor is a Cantor set density across the unstable direction on the attractor, which is not the natural invariant density. This Cantor set density has gaps in it, so that the state point never comes close to the separation point where lobe switching occurs. In this manner, the signal XAtrans(t) is much more resistant to noise. Note that although the invariant density on the attractor is now a Cantor set density, and not the natural invariant density, that the motion still corresponds to a possible natural motion of the system, it is just that the symbol sequence produced by the oscillator 22 is very unlikely. The signal outputs Xdet(t) and Xtrans(t) still obey the differential equations that define the oscillator 22, and the use of synchronization with the receiver oscillator 62 is therefore still possible since the trajectory is a possible natural trajectory. Accordingly, uninterrupted bit recovery output RecBit(nT) is achieved even when channel 12 is intermittent.

The synchronization time for the receiver oscillator 62 depends on how the synchronization is implemented and can be adjusted depending on the noise in the system by varying the coupling. If the coupling is too tight, however, noise in the system will cause the receiver oscillator 62 to track the noise too closely and therefore not accurately lock to the actual transmitter oscillator state vector. On the other hand, a loose coupling will prevent the oscillator 62 from tracking noise but will increase the length of time, or number of bit periods, required for synchronization. This is an engineering design choice that will be determined the specific channel being used. The coupling means of FIGS. 8 and 10, and the natural dynamics of the receiver oscillator 62, couple the receiver 14 and synchronize to the incoming signal Xrec(t) when the signal is present. When the Xrec(t) drops out the same coupling means disengages the oscillator 62 which then, for the next N cycles, continues on the same path as transmitter oscillator. The number N is of course dependent on the synchronization time and system noise. If Xrec(t) is received before N bit cycles required to capture the dynamics of the transmitter oscillator 22 and, hence, the receiver oscillator re-synchronizes to transmitter oscillator 22 trajectory for the next N cycles.

While the foregoing invention has been described with specific references to examples of its preferred embodiments, it should be understood that various substitutions, variations, and modifications may be made thereto without departing from the scope of the invention as defined in the appended claims.

Having thus described my invention, what I claim as new and desire to secure by Letters Patent is as follows:

1. A predictive correction communication system comprising:
    a symbol encoder having
    means for receiving an externally generated N-bit sequence,
    means for generating an oscillating state signal having a deterministic chaotic trajectory,
    means for controlling said means for generating an oscillating state signal to a state on its deterministic chaotic trajectory where a subsequent N-cycle trajectory segment encodes the N-bit sequence,
    means for transmitting a communication signal based on said state signal; and
    a predictive symbol receiver having means for estimating, based on a received communication signal over n bit periods, a future trajectory of said communication signal extending approximately N bit periods, where n<<N comprising
        means for generating a receiver state signal having said deterministic chaotic trajectory, said means having a coupling means for initializing said receiver state signal to a state based on said received communication signal in response to said received communication signal being above a predetermined threshold for approximately n bit periods, and
        a symbol detector means for generating estimated bits of said N-bit sequence based on the receiver state signal.

2. A predictive correction communication system according to claim 1, wherein said deterministic chaotic trajectory is one of a group of attractors consisting of a Lorenz type attractor and a Rossler type attractor, and wherein said means for generating a receiver state signal having said deterministic chaotic trajectory comprises an electronic oscillator circuit having a plurality of circuit elements interconnected such that a voltage across a first and a voltage across a second of said elements jointly form a two dimensional projection of said deterministic chaotic trajectory.

3. A predictive correction communication system according to claim 2, wherein said symbol detector means has means for detecting said receiver state signal being in a first region of said two-dimensional projection and a being in a second region of said two dimensional projection, and has means for generating a value of said estimate of bits based on said detection.

4. A predictive correction communication system according to claim 2, wherein said coupling means connects a signal to said received transmit signal to at least one of said plurality of circuit elements in response to said received communication signal being above said threshold.

5. A predictive correction communication system according to claim 2, wherein said coupling means connects a signal proportional to said received transmit signal to at least one of said plurality of circuit elements in response to said received communication signal, wherein the constant of proportionality is proportional to a magnitude of said received communication signal.

6. A predictive correction communication system according to claim 1 wherein said means for generating an oscillating state signal having a deterministic chaotic trajectory and said means for generating a receiver state signal having said deterministic chaotic trajectory each comprise a first and a second electronic oscillator circuit, said first and second electronic oscillator circuits having substantially identical circuit topologies.

7. A predictive correction communication system according to claim 1, wherein said deterministic chaotic trajectory is one of a group of attractors consisting of a Lorenz type attractor and a Rossler type attractor, and wherein said means for generating an oscillating state signal having a deterministic chaotic trajectory and said means for generating a receiver state signal having said deterministic chaotic trajectory each comprise a first and a second electronic oscillator circuit, said first and second electronic oscillator circuits having substantially identical circuit topologies.

8. A predictive correction communication system comprising:
    a symbol encoder having
    means for storing at least $2^N$ different trajectory interval data, each being on the same deterministic chaotic trajectory;
    means for receiving an externally generated N-bit sequence,
    means for selecting one of said $2^N$ trajectory interval data based on said N-bit sequence, and for generating a state signal representing a segment of said deterministic chaotic trajectory defined by said trajectory data,
    means for transmitting a communication signal based on said state signal; and
    a predictive symbol receiver having means for estimating, based on a received communication signal over n bit periods, a future trajectory of said communication signal over a subsequent approximately N bit periods, where n<<N comprising
        means for generating a receiver state signal representing said deterministic chaotic trajectory, said means having a coupling means for initializing said receiver state signal to a state based on said communication signal in response to said communication signal being above a predetermined threshold for approximately n bit periods, and a symbol detector means for generating an estimate of said N-bit sequence based on the receiver state signal.

9. A communication system comprising:

a transmitter chaotic oscillator means for generating an x(t) and y(t) signal, said x(t) and y(t) signal representing a two-dimensional projection of a first vector moving along a deterministic chaotic state trajectory in a state space;

a transmitter dynamic control means for receiving an externally generated stream of symbols, and for arranging said into N-bit blocks, and for initializing said transmitter oscillator means to an x(t) and y(t) source state, said source state being an interval on said deterministic chaotic state trajectory from which said trajectory sequentially orbits within and transitions between a first and second quadrant of said two-dimensional projection, in an order corresponding to the symbol value sequence of the N-bit block;

means for detecting and for generating a symbol transmit signal Xtrans(t) representing at least one of said x(t) and y(t);

means for receiving said symbol transmit signal Xtrans(t) and for outputting a corresponding received signal Xrec(t);

a receiver chaotic oscillator means for generating an x'(t) and y'(t) signal, said x'(t) and y'(t) signal representing a two-dimensional projection of a second vector moving along a deterministic chaotic state trajectory having a form substantially identical to the deterministic chaotic state trajectory of the transmitter oscillator means;

means for coupling said receiver chaotic oscillator means to said Xrec(t) signal wherein, in response to said Xrec(t) signal being greater than a predetermined threshold, said x'(t) and y'(t) signals are converged to a synchronous relation with said x(t) and y(t) signals of the transmitter chaotic oscillator means; and a symbol recovery means for detecting which of a first and a second quadrant of said two-dimensional projection that said x'(t) and y'(t) are in, based on said x'(t) and y'(t) values, and for outputting a recovered symbol signal in response, whereby, due to the deterministic chaotic state trajectory of the receiver having a form substantially identical to the deterministic chaotic state trajectory of the transmitter oscillator means, after said Xrec(t) signal falls below said predetermined threshold said x'(t) and y'(t) signals continue to estimate said x(t) and y(t) signals for approximately N bit cycles, and said symbol recovery means continues to output a sequence of said recovered symbol signals for a approximately N cycles which estimates an N-bit block of said externally generated stream of symbols.

10. A method for communication comprising steps of:

receiving an externally generated N-bit sequence;

generating an oscillating state signal having a deterministic chaotic trajectory, and having an initial state on said deterministic chaotic trajectory where a subsequent N-cycle trajectory segment encodes the N-bit sequence;

transmitting a communication signal based on said state signal; and estimating, based on a received communication signal over n bit periods, a future trajectory of said communication signal extending approximately N bit periods, where n<<N, said estimating comprising steps of generating a receiver state signal representing said deterministic chaotic trajectory, wherein said receiver state signal is initialized to a state based on said communication signal in response to said communication signal being above a predetermined threshold for approximately n bit periods, and generating an estimate of said N-bit sequence based on the receiver state signal.

* * * * *